United States Patent
Lau et al.

(10) Patent No.: US 10,628,783 B2
(45) Date of Patent: *Apr. 21, 2020

(54) METHOD AND SYSTEM FOR PROVIDING SHIPMENT TRACKING AND NOTIFICATIONS

(71) Applicant: IpVenture, Inc., San Jose, CA (US)

(72) Inventors: Chung Lau, Sunnyvale, CA (US); C. Douglass Thomas, Saratoga, CA (US)

(73) Assignee: IpVenture, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/802,641

(22) Filed: Mar. 13, 2013

(65) Prior Publication Data

US 2013/0297524 A1    Nov. 7, 2013

Related U.S. Application Data

(63) Continuation of application No. 12/924,470, filed on Sep. 27, 2010, now Pat. No. 8,725,165, which is a
(Continued)

(51) Int. Cl.
*H04W 24/00* (2009.01)
*G06Q 10/08* (2012.01)
*G06Q 10/00* (2012.01)
*H04L 29/08* (2006.01)
*H04W 4/029* (2018.01)
(Continued)

(52) U.S. Cl.
CPC ......... *G06Q 10/0833* (2013.01); *G06Q 10/00* (2013.01); *G06Q 10/0832* (2013.01); *H04L 67/04* (2013.01); *H04L 67/18* (2013.01); *H04W 4/029* (2018.02); *H04W 4/027* (2013.01); *H04W 64/00* (2013.01)

(58) Field of Classification Search
USPC ......... 455/456.1, 456.2, 456.3, 404.2, 414.2, 455/404.02; 340/539.13, 988
See application file for complete search history.

(56) References Cited

U.S. PATENT DOCUMENTS

| 3,975,941 A | 8/1976 | Smith |
| 4,719,920 A | 1/1988 | Alt et al. |
| (Continued) | | |

FOREIGN PATENT DOCUMENTS

| EP | 0 874 529 A2 | 10/1998 |
| EP | 1 037 447 A2 | 9/2000 |
| (Continued) | | |

OTHER PUBLICATIONS

Office Action for U.S. Appl. No. 10/397,637, dated Sep. 29, 2006.
(Continued)

*Primary Examiner* — Quynh H Nguyen

(57) ABSTRACT

Improved approaches for monitoring status of articles being shipped are disclosed. The monitoring can produce notifications to interested parties. The notifications typically contain status information pertaining to the articles being shipped. Alternatively, interested parties can gain access to status information pertaining to the articles being shipped via a website. According to one embodiment, the status information includes at least position (location) information and shipping conditions information.

62 Claims, 9 Drawing Sheets

Related U.S. Application Data continuation of application No. 11/732,581, filed on Apr. 3, 2007, now Pat. No. 7,809,377, which is a continuation of application No. 10/397,637, filed on Mar. 26, 2003, now Pat. No. 7,212,829.

(60) Provisional application No. 60/444,198, filed on Jan. 30, 2003, provisional application No. 60/418,491, filed on Oct. 15, 2002, provisional application No. 60/404,645, filed on Aug. 19, 2002, provisional application No. 60/375,998, filed on Apr. 24, 2002.

(51) Int. Cl.
*H04W 4/02* (2018.01)
*H04W 64/00* (2009.01)

(56) References Cited

U.S. PATENT DOCUMENTS

| | | |
|---|---|---|
| 5,115,223 A | 5/1992 | Moody |
| 5,337,579 A | 8/1994 | Saia, III et al. |
| 5,347,274 A | 9/1994 | Hassett |
| 5,353,034 A | 10/1994 | Sato et al. |
| 5,389,934 A | 2/1995 | Kass |
| 5,394,333 A | 2/1995 | Kao |
| 5,400,020 A | 3/1995 | Jones et al. |
| 5,422,814 A | 6/1995 | Sprague et al. |
| 5,422,816 A | 6/1995 | Sprague et al. |
| 5,461,365 A | 10/1995 | Schlager et al. |
| 5,470,233 A | 11/1995 | Fruchterman et al. |
| 5,491,486 A | 2/1996 | Welles, II et al. |
| 5,512,902 A | 4/1996 | Guthrie et al. |
| 5,515,858 A | 5/1996 | Myllymaki |
| 5,528,247 A | 6/1996 | Nonami |
| 5,528,518 A | 6/1996 | Bradshaw et al. |
| 5,532,690 A | 7/1996 | Hertel |
| 5,539,748 A | 7/1996 | Raith |
| 5,541,845 A | 7/1996 | Klein |
| 5,543,789 A | 8/1996 | Behr et al. |
| 5,550,551 A | 8/1996 | Alesio |
| 5,563,606 A | 10/1996 | Wang |
| 5,568,119 A | 10/1996 | Schipper et al. |
| 5,570,412 A | 10/1996 | LeBlanc |
| 5,576,716 A | 11/1996 | Sadler |
| 5,592,173 A | 1/1997 | Lau et al. |
| 5,598,460 A | 1/1997 | Tendler |
| 5,604,708 A | 2/1997 | Helms et al. |
| 5,623,260 A | 4/1997 | Jones |
| 5,623,418 A | 4/1997 | Rostoker |
| 5,627,517 A | 5/1997 | Theimer et al. |
| 5,629,678 A | 5/1997 | Gargano et al. |
| 5,633,874 A | 5/1997 | Diachina et al. |
| 5,650,770 A | 7/1997 | Schlager et al. |
| 5,652,570 A | 7/1997 | Lepkofker |
| 5,673,692 A | 10/1997 | Schulze et al. |
| 5,686,888 A | 11/1997 | Welles, II et al. |
| 5,710,551 A | 1/1998 | Ridgeway |
| 5,712,619 A | 1/1998 | Simkin |
| 5,731,757 A | 3/1998 | Layson, Jr. |
| 5,731,788 A | 3/1998 | Reeds |
| 5,742,233 A | 4/1998 | Hoffman et al. |
| 5,751,245 A | 5/1998 | Janky et al. |
| 5,771,001 A | 6/1998 | Cobb |
| 5,771,455 A | 6/1998 | Kennedy, III et al. |
| 5,774,876 A | 6/1998 | Woolley et al. |
| 5,786,789 A | 7/1998 | Janky |
| 5,797,091 A | 8/1998 | Clise et al. |
| 5,806,018 A | 9/1998 | Smith et al. |
| 5,808,565 A | 9/1998 | Matta et al. |
| RE35,920 E | 10/1998 | Sorden et al. |
| 5,825,283 A | 10/1998 | Camhi |
| 5,826,195 A | 10/1998 | Westerlage et al. |
| 5,835,907 A | 11/1998 | Newman |
| 5,841,352 A | 11/1998 | Prakash |
| 5,844,862 A | 12/1998 | Cocatre-Zilgien |
| 5,850,196 A | 12/1998 | Mowers |
| 5,852,775 A | 12/1998 | Hidary |
| 5,861,841 A | 1/1999 | Gildea et al. |
| 5,883,594 A | 3/1999 | Lau |
| 5,889,770 A | 3/1999 | Jokiaho et al. |
| 5,892,454 A | 4/1999 | Schipper et al. |
| 5,894,266 A | 4/1999 | Wood, Jr. et al. |
| 5,902,347 A | 5/1999 | Backman et al. |
| 5,905,461 A | 5/1999 | Neher |
| 5,910,799 A | 6/1999 | Carpenter et al. |
| 5,913,078 A | 6/1999 | Kimura et al. |
| 5,917,433 A | 6/1999 | Keillor et al. |
| 5,918,180 A | 6/1999 | Dimino |
| 5,928,309 A | 7/1999 | Korver et al. |
| 5,938,721 A | 8/1999 | Dussell et al. |
| 5,940,004 A | 8/1999 | Fulton |
| 5,948,040 A | 9/1999 | DeLorme et al. |
| 5,948,043 A | 9/1999 | Mathis |
| 5,950,125 A | 9/1999 | Buhrmann et al. |
| 5,959,575 A | 9/1999 | Abbott |
| 5,959,577 A | 9/1999 | Fan et al. |
| 5,963,130 A | 10/1999 | Schlager et al. |
| 5,970,388 A | 10/1999 | Will |
| 5,982,285 A | 11/1999 | Bueche et al. |
| 5,982,807 A | 11/1999 | Snell |
| 5,983,108 A | 11/1999 | Kennedy, III et al. |
| 5,983,158 A | 11/1999 | Suzuki et al. |
| 5,991,690 A | 11/1999 | Murphy |
| 5,995,849 A | 11/1999 | Williams et al. |
| 6,002,363 A | 12/1999 | Krasner |
| 6,002,982 A | 12/1999 | Fry |
| 6,009,319 A | 12/1999 | Khullar et al. |
| 6,013,007 A | 1/2000 | Root et al. |
| 6,014,080 A | 1/2000 | Layson, Jr. |
| 6,014,090 A | 1/2000 | Rosen et al. |
| 6,018,704 A | 1/2000 | Kohli et al. |
| 6,023,241 A | 2/2000 | Clapper |
| 6,031,496 A | 2/2000 | Kuittinen |
| 6,032,051 A | 2/2000 | Hall et al. |
| 6,034,622 A | 3/2000 | Levine |
| 6,052,646 A | 4/2000 | Kirkhart et al. |
| 6,052,696 A | 4/2000 | Euler et al. |
| 6,054,928 A | 4/2000 | Lemelson et al. |
| 6,064,336 A | 5/2000 | Krasner |
| 6,067,018 A | 5/2000 | Skelton et al. |
| 6,067,044 A | 5/2000 | Whelan et al. |
| 6,072,396 A | 6/2000 | Gaukel |
| 6,078,290 A | 6/2000 | McBurney et al. |
| 6,083,248 A | 7/2000 | Thompson |
| 6,083,353 A | 7/2000 | Alexander |
| 6,085,090 A | 7/2000 | Yee et al. |
| 6,094,168 A | 7/2000 | Duffett-Smith et al. |
| 6,100,806 A | 8/2000 | Gaukel |
| 6,101,710 A | 8/2000 | Selinger et al. |
| 6,104,334 A | 8/2000 | Allport |
| 6,111,540 A | 8/2000 | Krasner |
| 6,115,595 A | 9/2000 | Rodal et al. |
| 6,121,921 A | 9/2000 | Ishigaki |
| 6,125,325 A | 9/2000 | Kohli et al. |
| 6,131,067 A | 10/2000 | Girerd et al. |
| 6,140,863 A | 10/2000 | Fujisawa |
| 6,140,957 A | 10/2000 | Wilson et al. |
| 6,141,570 A | 10/2000 | O'Neill, Jr. et al. |
| 6,144,303 A | 11/2000 | Federman |
| 6,148,280 A | 11/2000 | Kramer |
| 6,154,422 A | 11/2000 | Shinkawa et al. |
| 6,163,696 A | 12/2000 | Bi et al. |
| 6,169,902 B1 | 1/2001 | Kawamoto |
| 6,171,264 B1 | 1/2001 | Bader |
| 6,172,640 B1 | 1/2001 | Durst et al. |
| 6,175,616 B1 | 1/2001 | Light et al. |
| 6,198,390 B1 | 3/2001 | Schlager et al. |
| 6,198,431 B1 | 3/2001 | Gibson |
| 6,198,930 B1 | 3/2001 | Schipper |
| 6,199,045 B1 | 3/2001 | Giniger et al. |
| 6,204,807 B1 | 3/2001 | Odagiri et al. |
| 6,212,133 B1 | 4/2001 | McCoy et al. |
| 6,226,622 B1 | 5/2001 | Dabbiere |
| 6,231,519 B1 | 5/2001 | Blants et al. |

(56) References Cited

U.S. PATENT DOCUMENTS

| | | |
|---|---|---|
| 6,232,916 B1 | 5/2001 | Grillo et al. |
| 6,236,358 B1 | 5/2001 | Durst et al. |
| 6,238,337 B1 | 5/2001 | Kambhatla et al. |
| 6,243,039 B1 | 6/2001 | Elliot |
| 6,243,660 B1 | 6/2001 | Hsu et al. |
| 6,246,376 B1 | 6/2001 | Bork et al. |
| 6,252,543 B1 | 6/2001 | Camp |
| 6,252,544 B1 | 6/2001 | Hoffberg |
| 6,259,944 B1 | 7/2001 | Margulis et al. |
| 6,263,280 B1 | 7/2001 | Stingone, Jr. |
| 6,266,612 B1 | 7/2001 | Dussell et al. |
| 6,272,457 B1 | 8/2001 | Ford et al. |
| 6,278,936 B1 | 8/2001 | Jones |
| 6,281,797 B1 | 8/2001 | Forster |
| 6,282,362 B1 | 8/2001 | Murphy et al. |
| 6,282,495 B1 | 8/2001 | Kirkhart et al. |
| 6,285,314 B1 | 9/2001 | Nagatsuma et al. |
| 6,292,687 B1 | 9/2001 | Lowell et al. |
| 6,298,306 B1 | 10/2001 | Suarez et al. |
| 6,300,875 B1 | 10/2001 | Schafer |
| 6,302,844 B1 | 10/2001 | Walker et al. |
| 6,304,467 B1 | 10/2001 | Nebrigic |
| 6,314,308 B1 | 11/2001 | Sheynblat et al. |
| 6,315,719 B1 | 11/2001 | Rode et al. |
| 6,317,049 B1 | 11/2001 | Toubia et al. |
| 6,321,091 B1 | 11/2001 | Holland |
| 6,321,158 B1 | 11/2001 | DeLorme et al. |
| 6,323,807 B1 | 11/2001 | Golding et al. |
| 6,324,213 B1 | 11/2001 | Harrison |
| 6,327,533 B1 | 12/2001 | Chou |
| 6,330,149 B1 | 12/2001 | Burrell |
| 6,331,817 B1 | 12/2001 | Goldberg |
| 6,331,825 B1 | 12/2001 | Ladner et al. |
| 6,339,397 B1 | 1/2002 | Baker |
| 6,340,928 B1 | 1/2002 | McCurdy |
| 6,342,847 B1 | 1/2002 | Archuleta et al. |
| 6,349,257 B1 | 2/2002 | Liu et al. |
| 6,353,390 B1 | 3/2002 | Beri et al. |
| 6,353,798 B1 | 3/2002 | Green et al. |
| 6,356,836 B1 | 3/2002 | Adolph |
| 6,356,841 B1 | 3/2002 | Hamrick et al. |
| 6,362,778 B2 | 3/2002 | Neher |
| 6,363,254 B1 | 3/2002 | Jones et al. |
| 6,363,323 B1 | 3/2002 | Jones |
| 6,366,871 B1 | 4/2002 | Geva |
| 6,373,430 B1 | 4/2002 | Beason et al. |
| 6,377,810 B1 | 4/2002 | Geiger et al. |
| 6,384,724 B1 | 5/2002 | Landais |
| 6,388,612 B1 | 5/2002 | Neher |
| 6,393,346 B1 | 5/2002 | Keith et al. |
| 6,404,352 B1 | 6/2002 | Ichikawa et al. |
| 6,407,698 B1 | 6/2002 | Ayed |
| 6,411,892 B1 | 6/2002 | Van Diggelen |
| 6,411,899 B2 | 6/2002 | Dussell et al. |
| 6,421,538 B1 | 7/2002 | Byrne |
| 6,426,719 B1 | 7/2002 | Nagareda et al. |
| 6,427,120 B1 | 7/2002 | Garin et al. |
| 6,430,602 B1 | 8/2002 | Kay et al. |
| 6,433,732 B1 | 8/2002 | Dutta et al. |
| 6,434,396 B1 | 8/2002 | Rune |
| 6,437,692 B1 | 8/2002 | Petite et al. |
| 6,441,778 B1 | 8/2002 | Durst et al. |
| 6,442,380 B1 | 8/2002 | Mohindra |
| 6,442,391 B1 | 8/2002 | Johansson et al. |
| 6,443,890 B1 | 9/2002 | Schulze et al. |
| 6,445,937 B1 | 9/2002 | daSilva |
| 6,453,237 B1 | 9/2002 | Fuchs et al. |
| 6,463,272 B1 | 10/2002 | Wallace et al. |
| 6,466,821 B1 | 10/2002 | Pianca et al. |
| 6,469,639 B2 | 10/2002 | Tanenhaus et al. |
| 6,471,087 B1 | 10/2002 | Shusterman |
| 6,478,736 B1 | 11/2002 | Mault |
| 6,484,034 B1 | 11/2002 | Tsunehara et al. |
| 6,496,775 B2 | 12/2002 | McDonald, Jr. et al. |
| 6,501,429 B2 | 12/2002 | Nakamura et al. |
| 6,505,048 B1 | 1/2003 | Moles et al. |
| 6,505,049 B1 | 1/2003 | Dorenbosch |
| 6,512,456 B1 | 1/2003 | Taylor, Jr. |
| 6,513,532 B2 | 2/2003 | Mault et al. |
| 6,522,871 B1 | 2/2003 | Patrick et al. |
| 6,522,889 B1 | 2/2003 | Aarnio |
| 6,529,164 B1 | 3/2003 | Carter |
| 6,529,822 B1 | 3/2003 | Millington et al. |
| 6,544,193 B2 | 4/2003 | Abreu |
| 6,552,652 B2 | 4/2003 | Beken |
| 6,553,336 B1 | 4/2003 | Johnson et al. |
| 6,559,620 B2 | 5/2003 | Zhou et al. |
| 6,560,463 B1 | 5/2003 | Santhoff |
| 6,569,094 B2 | 5/2003 | Suzuki et al. |
| 6,571,193 B1 | 5/2003 | Unuma et al. |
| 6,579,231 B1 | 6/2003 | Phipps |
| 6,579,844 B1 | 6/2003 | Morrison et al. |
| 6,611,688 B1 | 8/2003 | Raith |
| 6,616,593 B1 | 9/2003 | Elliot et al. |
| 6,625,437 B1 | 9/2003 | Jampolsky et al. |
| 6,630,885 B2 | 10/2003 | Hardman et al. |
| 6,640,085 B1 | 10/2003 | Chatzipetros et al. |
| 6,650,907 B1 | 11/2003 | Kamperschroer et al. |
| 6,661,372 B1 | 12/2003 | Girerd et al. |
| 6,679,071 B1 | 1/2004 | Storey et al. |
| 6,696,982 B2 | 2/2004 | Yoshioka et al. |
| 6,697,103 B1 | 2/2004 | Fernandez et al. |
| 6,697,730 B2 | 2/2004 | Dickerson |
| 6,714,158 B1 | 3/2004 | Underbrink et al. |
| 6,714,791 B2 | 3/2004 | Friedman |
| 6,721,542 B1 | 4/2004 | Anttila et al. |
| 6,741,927 B2 | 5/2004 | Jones |
| 6,747,675 B1 | 6/2004 | Abbott et al. |
| 6,748,318 B1 | 6/2004 | Jones |
| 6,788,766 B2 | 9/2004 | Logan |
| 6,801,853 B2 | 10/2004 | Workman |
| 6,804,606 B2 | 10/2004 | Jones |
| 6,825,767 B2 | 11/2004 | Humbard |
| 6,832,093 B1 | 12/2004 | Ranta |
| 6,847,892 B2 | 1/2005 | Zhou et al. |
| 6,856,804 B1 | 2/2005 | Ciotta |
| 6,856,807 B1 | 2/2005 | Raith |
| 6,865,385 B1 | 3/2005 | Kohda et al. |
| 6,876,862 B1 | 4/2005 | Tanaka |
| 6,888,879 B1 | 5/2005 | Lennen |
| 6,937,900 B1 | 8/2005 | Pianca et al. |
| 6,952,645 B1 | 10/2005 | Jones |
| 6,975,941 B1 | 12/2005 | Lau et al. |
| 6,980,813 B2 | 12/2005 | Mohi et al. |
| 6,980,826 B2 | 12/2005 | Yamaguchi |
| 6,997,882 B1 | 2/2006 | Parker et al. |
| 7,010,144 B1 | 3/2006 | Davis et al. |
| 7,071,842 B1 | 7/2006 | Brady, Jr. |
| 7,085,253 B2 | 8/2006 | Yang |
| 7,110,773 B1 | 9/2006 | Wallace et al. |
| 7,136,832 B2 | 11/2006 | Li et al. |
| 7,187,278 B2 | 3/2007 | Biffar |
| 7,212,829 B1 | 5/2007 | Lau et al. |
| 7,218,938 B1 | 5/2007 | Lau et al. |
| 7,253,731 B2 | 8/2007 | Joao |
| 7,308,272 B1 | 12/2007 | Wortham |
| 7,321,774 B1 | 1/2008 | Lau et al. |
| 7,325,061 B2 | 1/2008 | Haruki |
| 7,366,522 B2 | 4/2008 | Thomas |
| 7,375,682 B1 | 5/2008 | Tester et al. |
| 7,403,972 B1 | 7/2008 | Lau et al. |
| 7,482,920 B2 | 1/2009 | Joao |
| 7,539,557 B2 | 5/2009 | Yamauchi |
| 7,809,377 B1 | 10/2010 | Lau et al. |
| 7,905,832 B1 | 3/2011 | Lau et al. |
| 7,953,809 B2 | 5/2011 | Lau et al. |
| 8,176,135 B2 | 5/2012 | Lau et al. |
| 8,285,484 B1 | 10/2012 | Lau et al. |
| 8,301,158 B1 | 10/2012 | Thomas |
| 8,447,822 B2 | 5/2013 | Lau et al. |
| 8,611,920 B2 | 12/2013 | Lau et al. |
| 8,620,343 B1 | 12/2013 | Lau et al. |
| 8,700,050 B1 | 4/2014 | Thomas |
| 8,725,165 B2 | 5/2014 | Lau et al. |

(56) References Cited

U.S. PATENT DOCUMENTS

| | | |
|---|---|---|
| 8,753,273 B1 | 6/2014 | Lau et al. |
| 8,868,103 B2 | 10/2014 | Thomas |
| 8,886,220 B2 | 11/2014 | Lau et al. |
| 8,975,941 B2 | 3/2015 | Zierhofer |
| 9,049,571 B2 | 6/2015 | Lau et al. |
| 9,074,903 B1 | 7/2015 | Lau et al. |
| 9,182,238 B2 | 11/2015 | Lau et al. |
| 9,219,988 B2 | 12/2015 | Lau et al. |
| 9,456,350 B2 | 9/2016 | Lau et al. |
| 9,596,579 B2 | 3/2017 | Lau et al. |
| 9,706,374 B2 | 7/2017 | Lau et al. |
| 7,212,829 C1 | 8/2017 | Lau et al. |
| 9,723,442 B2 | 8/2017 | Lau et al. |
| 9,759,817 B2 | 9/2017 | Lau et al. |
| 9,769,630 B2 | 9/2017 | Lau et al. |
| 9,930,503 B2 | 3/2018 | Lau et al. |
| 9,998,886 B2 | 6/2018 | Lau et al. |
| 10,034,150 B2 | 7/2018 | Lau et al. |
| 10,327,115 B2 | 6/2019 | Lau et al. |
| 10,356,568 B2 | 7/2019 | Lau et al. |
| 2001/0006891 A1 | 7/2001 | Cho |
| 2001/0020204 A1 | 9/2001 | Runyon et al. |
| 2001/0027378 A1 | 10/2001 | Tennison et al. |
| 2001/0027384 A1 | 10/2001 | Schulze et al. |
| 2001/0027525 A1 | 10/2001 | Gamlin |
| 2001/0028304 A1 | 10/2001 | I'Anson et al. |
| 2001/0041554 A1 | 11/2001 | Rowell |
| 2001/0044299 A1 | 11/2001 | Sandegren |
| 2001/0044332 A1 | 11/2001 | Yamada et al. |
| 2001/0047125 A1 | 11/2001 | Quy |
| 2001/0052849 A1 | 12/2001 | Jones, Jr. |
| 2002/0000916 A1 | 1/2002 | Richards |
| 2002/0000930 A1 | 1/2002 | Crowson et al. |
| 2002/0008661 A1 | 1/2002 | McCall et al. |
| 2002/0015439 A1 | 2/2002 | Kohli et al. |
| 2002/0016173 A1 | 2/2002 | Hunzinger |
| 2002/0027507 A1 | 3/2002 | Yarin et al. |
| 2002/0028988 A1 | 3/2002 | Suzuki et al. |
| 2002/0036593 A1 | 3/2002 | Ying |
| 2002/0038182 A1 | 3/2002 | Wong et al. |
| 2002/0049742 A1 | 4/2002 | Chan et al. |
| 2002/0050945 A1 | 5/2002 | Tsukishima et al. |
| 2002/0055362 A1 | 5/2002 | Aoyama |
| 2002/0057192 A1 | 5/2002 | Eagleson et al. |
| 2002/0063622 A1 | 5/2002 | Armstrong et al. |
| 2002/0071677 A1 | 6/2002 | Sumanaweera |
| 2002/0077080 A1 | 6/2002 | Greene |
| 2002/0087260 A1 | 7/2002 | Hancock et al. |
| 2002/0087619 A1 | 7/2002 | Tripathi |
| 2002/0094067 A1 | 7/2002 | August |
| 2002/0099567 A1 | 7/2002 | Joao |
| 2002/0111171 A1 | 8/2002 | Boesch et al. |
| 2002/0111819 A1 | 8/2002 | Li et al. |
| 2002/0115450 A1 | 8/2002 | Muramatsu |
| 2002/0115453 A1 | 8/2002 | Poulin et al. |
| 2002/0116080 A1 | 8/2002 | Birnbach et al. |
| 2002/0119770 A1 | 8/2002 | Twitchell et al. |
| 2002/0119789 A1 | 8/2002 | Friedman |
| 2002/0120475 A1 | 8/2002 | Morimoto |
| 2002/0120503 A1 | 8/2002 | Iwayama et al. |
| 2002/0138196 A1 | 9/2002 | Polidi et al. |
| 2002/0140081 A1 | 10/2002 | Chou et al. |
| 2002/0173910 A1 | 11/2002 | McCall et al. |
| 2002/0191757 A1 | 12/2002 | Belrose |
| 2002/0193121 A1 | 12/2002 | Nowak et al. |
| 2002/0193996 A1 | 12/2002 | Squibbs et al. |
| 2002/0198003 A1 | 12/2002 | Kaplan |
| 2002/0198055 A1 | 12/2002 | Bull et al. |
| 2003/0003943 A1 | 1/2003 | Bajikar |
| 2003/0009410 A1 | 1/2003 | Ramankutty et al. |
| 2003/0013445 A1 | 1/2003 | Fujiwara et al. |
| 2003/0018430 A1 | 1/2003 | Ladetto et al. |
| 2003/0036389 A1 | 2/2003 | Yen |
| 2003/0036683 A1 | 2/2003 | Kehr et al. |
| 2003/0054827 A1 | 3/2003 | Schmidl et al. |
| 2003/0068605 A1 | 4/2003 | Kullok et al. |
| 2003/0069759 A1 | 4/2003 | Smith |
| 2003/0083011 A1 | 5/2003 | Haller et al. |
| 2003/0083046 A1 | 5/2003 | Mathis |
| 2003/0083814 A1 | 5/2003 | Gronemeyer |
| 2003/0095540 A1 | 5/2003 | Mulligan et al. |
| 2003/0100326 A1 | 5/2003 | Grube et al. |
| 2003/0107514 A1 | 6/2003 | Syrjarinne et al. |
| 2003/0114206 A1 | 6/2003 | Timothy et al. |
| 2003/0151507 A1 | 8/2003 | Andre et al. |
| 2003/0163287 A1 | 8/2003 | Vock |
| 2003/0182052 A1 | 9/2003 | DeLorme |
| 2003/0204132 A1 | 10/2003 | Suzuki et al. |
| 2004/0034470 A1 | 2/2004 | Workman |
| 2004/0046637 A1 | 3/2004 | Wesby Van Swaay |
| 2004/0114731 A1 | 6/2004 | Gillett et al. |
| 2004/0117108 A1 | 6/2004 | Nemeth |
| 2004/0192352 A1 | 9/2004 | Vallstrom et al. |
| 2004/0204820 A1 | 10/2004 | Diaz |
| 2004/0233065 A1 | 11/2004 | Freeman |
| 2005/0250440 A1 | 11/2005 | Zhou et al. |
| 2006/0139375 A1 | 6/2006 | Rasmussen et al. |
| 2006/0173444 A1 | 8/2006 | Choy et al. |
| 2007/0156286 A1 | 7/2007 | Yamauchi |
| 2008/0021645 A1 | 1/2008 | Lau et al. |
| 2008/0261636 A1 | 10/2008 | Lau et al. |
| 2009/0042540 A1 | 2/2009 | Bodnar et al. |
| 2011/0022533 A1 | 1/2011 | Lau et al. |
| 2011/0223884 A1 | 9/2011 | Lau et al. |
| 2012/0220266 A1 | 8/2012 | Lau et al. |
| 2013/0203388 A1 | 8/2013 | Thomas et al. |
| 2013/0297524 A1 | 11/2013 | Lau et al. |
| 2014/0011524 A1 | 1/2014 | Lau et al. |
| 2014/0067708 A1 | 3/2014 | Lau et al. |
| 2014/0273953 A1 | 9/2014 | Lau et al. |
| 2014/0278084 A1 | 9/2014 | Lau et al. |
| 2014/0296659 A1 | 10/2014 | Lau et al. |
| 2015/0011243 A1 | 1/2015 | Thomas et al. |
| 2015/0038168 A1 | 2/2015 | Thomas et al. |
| 2015/0264576 A1 | 9/2015 | Lau et al. |
| 2016/0025863 A1 | 1/2016 | Lau et al. |
| 2016/0029175 A1 | 1/2016 | Lau et al. |
| 2016/0050533 A1 | 2/2016 | Lau et al. |
| 2017/0013426 A1 | 1/2017 | Lau et al. |
| 2017/0094458 A1 | 3/2017 | Thomas et al. |
| 2017/0111776 A1 | 4/2017 | Lau et al. |
| 2017/0111777 A1 | 4/2017 | Lau et al. |
| 2017/0188208 A1 | 6/2017 | Lau et al. |
| 2017/0295462 A1 | 10/2017 | Lau et al. |
| 2017/0353841 A1 | 12/2017 | Lau et al. |
| 2018/0011201 A1 | 1/2018 | Lau et al. |
| 2018/0027394 A1 | 1/2018 | Lau et al. |
| 2018/0211216 A1 | 7/2018 | Lau et al. |
| 2018/0213372 A1 | 7/2018 | Lau et al. |
| 2018/0255439 A1 | 9/2018 | Lau et al. |
| 2018/0302759 A1 | 10/2018 | Lau et al. |
| 2019/0215643 A1 | 7/2019 | Lau et al. |

FOREIGN PATENT DOCUMENTS

| | | |
|---|---|---|
| EP | 1 037 447 A3 | 10/2001 |
| JP | 09251069 A | 9/1997 |
| JP | 11-64482 | 3/1999 |
| JP | 11-258325 | 9/1999 |
| JP | 11-289574 | 10/1999 |
| JP | 11-306491 | 11/1999 |
| JP | 2001344678 A | 12/2001 |
| WO | 97/14054 | 4/1997 |
| WO | 97/41654 A1 | 11/1997 |
| WO | 98/01769 A1 | 1/1998 |
| WO | 98/16045 A1 | 4/1998 |
| WO | 98/40837 | 9/1998 |
| WO | WO 00/51391 | 8/2000 |
| WO | 01/50151 A1 | 7/2001 |
| WO | 01/63318 A1 | 8/2001 |
| WO | 01/75700 A2 | 10/2001 |
| WO | 02/42979 A1 | 5/2002 |
| WO | 02/084618 A1 | 10/2002 |
| WO | 03/012720 A1 | 2/2003 |

(56) References Cited

FOREIGN PATENT DOCUMENTS

OTHER PUBLICATIONS

Notice of Allowance for U.S. Appl. No. 10/397,637, dated Jan. 22, 2007.
Office Action for U.S. Appl. No. 11/732,581, dated Jan. 20, 2010.
Notice of Allowance for U.S. Appl. No. 11/732,581, dated Jun. 16, 2010.
Non-Final Office Action for U.S. Appl. No. 12/924,470, dated May 4, 2012.
Notice of Allowance for U.S. Appl. No. 12/924,480, dated Nov. 23, 2012.
Notice of Allowance for U.S. Appl. No. 12/924,480, dated Mar. 20, 2013.
U.S. Appl. No. 13/802,624, filed Mar. 13, 2013.
Request for Inter Partes Reexamination, U.S. Appl. No. 95/001,896, filed Feb. 16, 2012.
Order Granting/Denying Request for Inter Partes Reexamination, U.S. Appl. No. 95/001,896, mailed Apr. 3, 2012.
Office Action in Inter Partes Reexamination, U.S. Appl. No. 95/001,896, mailed Apr. 3, 2012.
Response to Office Action in Inter Partes Reexamination, U.S. Appl. No. 95/001,896, filed Jun. 4, 2012.
Thirty-Party Comments in Response to Patent Owner's Proposed Amendment and Response, U.S. Appl. No. 95/001,896, filed Jul. 5, 2012.
Office Action in Inter Partes Reexamination, U.S. Appl. No. 95/001,896, mailed Aug. 21, 2012.
Petition in Inter Partes Reexamination, U.S. Appl. No. 95/001,896, mailed Sep. 12, 2012.
Response to Office Action in Inter Partes Reexamination, U.S. Appl. No. 95/001,896, filed Sep. 21, 2012.
Third-Party Requester's Opposition to Patent Owner's Petition for Supervisory Review, U.S. Appl. No. 95/001,896, filed Sep. 27, 2012.
Thirty-Party Comments Regarding Patent Owner's Response to Action Closing Prosecution and Proposed Amendment, U.S. Appl. No. 95/001,896, filed Oct. 22, 2012.
"352C22 Miniature Low Profile ICP Accelerometer," Precision Accelerometers, PCB Piezoelectronics Products—SVS Division, webpages, pp. 1-2 (downloaded Apr. 11, 2002: www.pcb.com/products/svs/svs352c22.html).
"3G Mobile Internet Revolution, . . . only with Location Based Services!" pp. 1, (downloaded Aug. 10, 2002: http://webhome.idirect.com/~dental/3glocator/home.htm).
"Airline Cargo Containers," Case Study, RJI Incorporated, webpages, pp. 1-2 (downloaded Mar. 16, 2002: www.rji.cc/casestudies/airlinecargocontainers.html).
"Airline Food Carts," Case Study, RJI Incorporated, webpages, pp. 1-2 (downloaded Mar. 16, 2002: www.rji.cc/casestudies/airlinefoodcarts.html).
"An Introduction to SnapTrack Server-Aided GPS Technology," SnapTrack Inc., Apr. 3, 2007.
Archived page entitled "Money-Back Guarantee Policy" from fedex.com, archived on Aug. 17, 2000.
"Audiovox Intros GPS, Bluetooth Phone;" INT Media Group, Inc. (allNetDevices), Apr. 5, 2002. (downloaded: www.allnetdevices.com/wireless/news/2001/1/15/audiovox_intros.html).
"Carrier and end-user applications for wireless location systems," TruePosition, Inc., pp. 1-7, Mar. 13, 2013.
"Danger—Products" and "Hiptop Communicator Brochure," Danger, Inc., downloaded Oct. 26, 2003: www.danger.com/products.php).
"Developing a GPSs for the Global Supply Chain," Aberdeen Group, Inc., Executive White Paper, Jun. 2002.
"Devices for Text Messages in Deutsche Telekom's fixed network have already found their way into many households," Deutsche Telekom AG, Press Release, Mar. 13, 2002, pp. 1-2.

"Digital/Analog Compass Sensors" and "1655 Digital Compass Sensor," webpages, The Robson Company, Inc., pp. 1-2 (downloaded Apr. 11, 2002: www.dinsmoresensors.com/index.html).
"EarthTrack™ Vehicle Tracking Systems," Outfitter Satellite, Inc., 1998 (downloaded Jan. 22, 2000).
"Enhanced Tracking," United Parcel Service of America, Inc. (UPS), webpages, pp. 1-2 (downloaded Jun. 1, 2002: www.ups.com/myupsinfo/info/etrack?pnav=stdservice).
"Fleet Management Systems-Asset Tracking Devices," Axiom Navigation Inc., 2000-2001 (downloaded Oct. 19, 2002: www.axiomnav.com/Prod_Systems/prod_system.asp).
"Frozen Food Warehouse," Case Study, RJI Incorporated, webpages, pp. 1-3 (downloaded Mar. 16, 2002: www.rji.cc/casestudies/frozenfoodwarehouse.html).
"FunMail Launches on the NTT DoCoMo i-mode network," FunMail, Press Release, May 1, 2001, pp. 1-2.
"Global Cell Phone Location," Axiom Navigation Inc., 2000-2001 (downloaded Oct. 19, 2002: www.axiomnav.com/Prod_Global/prod_global.asp).
"Global Locating Services," SkyBitz, webpage, p. 1, (downloaded Nov. 15, 2002: www.skybitz.com/services/gls.html).
"GLS Communicator," SkyBitz, webpages, pp. 1-2, (downloaded Nov. 15, 2002: www.skybitz.com/gls/communicator.html).
"Guide to Tracking Info.," Nippon Express, website page, p. 1 (downloaded Jun. 9, 2002: www.nittsu.co.jp/edoc/howtoe.htm).
"Introduction to SMS," by C. Tull of Anywhere YouGo.com, pp. 1-4 (downloaded:www.devx.com/wireless/articles/SMS/SMSintro-asp), Mar. 13, 2013.
"IO Data Develops GPS Adapter for I-Mode Mobile," AsiaBizTech, Sep. 17, 2002, pp. 1-2.
"Locate Networks: Our Service," Locate Networks, webpages, pp. 1-7 (downloaded Sep. 26, 2002: www.locatenetworks.com/).
"MMS phones: Don't believe the hype," CNN.com/SCI-TECH, Aug. 8, 2002, pp. 1-3.
"Mobile Location Based Services: Cell Tracking Devices of People & Thongs . . . ," pp. 1-2, (downloaded Aug. 10, 2002: http://3glocate.com).
"MoniTrack," Case Study, RJI Incorporated, webpages, pp. 1-2 (downloaded Mar. 16, 2002: www.rji.cc/technology/telematic.html).
"my ups.com Benefits," United Parcel Service of America, Inc. (UPS), webpage, p. 1 (downloaded Apr. 13, 2002: www.ups.com/myupsinfo/info/benefits?pnav=stdsservice), Mar. 13, 2013.
"NavMate® Navigation System," Visteon Corporation, webpage, pp. 1-2 (downloaded Jun. 21, 2002: www.visteon.com/technology/automotive/navmate.html).
"News," SkyBitz, webpages, pp. 1-8, (downloaded Nov. 15, 2002: www.skybitz.com/about/news.html).
"Pakhound: Your Watchdog in the Shipping Industry," website pages, pp. 1-3 (downloaded Jun. 9, 2002: www.pakhound.com/fact.asp).
"Parkwatch and Wherenet Unveil the First Amusement Visitor Locating system," ParkWatch, Press Release, Jun. 27, 2000.
"pulver.com's Location Based Services Report," pulver.com, Inc., Oct. 2001, pp. 1-17 (downloaded Jun. 4, 2002: www.pulver.com/lbsreport/lastbsreport.02/oct01.txt).
"Radio Frequency Identification (RFID)," Case Study, RJI Incorporated, webpage, p. 1 (downloaded Mar. 16, 2002: www.rji.cc/technology/rfid.html).
"Real Time Location System (RTLS)," Case Study, RJI Incorporated, webpage, p. 1 (downloaded Mar. 16, 2002: www.rji.cc/technology/rtls.html).
"Real-Time Warehouse Tracking," Case Study, RJI Incorporated, webpages, pp. 1-2 (downloaded Mar. 16, 2002: www.rji.cc/casestudies/rtwarehousetracking.html).
"Savi Reusable Transport Container," Savi Technology, Inc., Apr. 30, 2002, pp. 1-2.
"Send images to i-mode phones," Mobile Media Japan, 2001, pp. 1-3.
"Ski Rental with Auto ID and Tracking," Case Study, RJI Incorporated, webpages, pp. 1-2 (downloaded Mar. 16, 2002: www.rji.cc/casestudies/skirentalcompany.html).

(56) References Cited

OTHER PUBLICATIONS

"SnapTrack and SignalSoft Corp. Team Up to Trial Location-based Information Service for GSM Test Group," Press Release, SnapTrack Inc., Dec. 6, 1999.
"SnapTrack Awarded Additional Key Patents for Enhanced GPS System," Press Release, SnapTrack Inc., Jan. 4, 2000.
"Start-up crams single chip with phone, GPS and Bluetooth," CNET Network, Inc. (ZDNET), Mar. 22, 2002 (downloaded: http://news.zdnet.co.uk/story/0,t284-x2107163,00.html).
"Status Icons/Messages," Yahoo! Messenger Help, Yahoo! Inc., 2002, pp. 1-2.
"Technical Applications of Our Current Technology," Aetherwire, webpages, pp. 1-4 (downloaded Mar. 16, 2002: www.aetherwire.com/CDROM/General/appl1.html).
"The Always on Network," Position Paper, Nortel Networks, 2002.
"Theme Park Visitors & Cashless Purchasing," Case Study, RJI Incorporated, webpages, pp. 1-2 (downloaded Mar. 16, 2002: www.rji.cc/casestudies/themepark.html).
"Track Shipments—Detailed Results," FedEx, webpages, pp. 1-2 (downloaded Oct. 29, 2002: www.fedex.com).
"Track Your FedEx Shipments via Email," FedEx, webpages, pp. 1-2 (downloaded Oct. 29, 2002: www.fedex.com).
"Tracking Helpful Tips," United Parcel Service of America, Inc. (UPS), webpages, pp. 1-2 (downloaded Jun. 1, 2002: www.ups.com/tracking/nm_help.html).
"Trimble and Rosum Team to Develop Universal Positioning Technology," Trimble Navigation, Inc., News Release, Feb. 27, 2003.
"Turning Position Into Knowledge," SkyBitz, webpage, p. 1, (downloaded Nov. 15, 2002: www.skybitz.com).
"UPS Package Tracking," United Parcel Service of America, Inc. (UPS), webpages, pp. 1-2 (downloaded Apr. 13, 2002: www.ups.com/tracking/tracking.html).
"UPS Wireless Solutions," United Parcel Service of America, Inc. (UPS), webpage, p. 1 (downloaded Apr. 13, 2002: www.ups.com/myupsinfo/info/wireless?pnav=stdsservice).
"Welcome to Iship, Inc.," iShip, Inc., webpages, pp. 1-2, (downloaded Jun. 9, 2002: www.iship.com/).
"Welcome to Traker Systems," Tracker Systems, webpages, pp. 1-2 (downloaded Jun. 9, 2002: www.trakersystems.com).
"What are Instant Messages?" Yahoo! Messenger Help, Yahoo! Inc., 2002, pp. 1.
"What is "3G" technology?," CNN.com/SCI-TECH, Oct. 22, 2001, pp. 1-3.
"What is a Friend List?" Yahoo! Messenger Help, Yahoo! Inc., 2002, pp. 1.
"Wherify Wireless and SiRF Team to Deliver Child Locator System," Wherify Wireless, Inc., Press Release, Mar. 19, 2001, pp. 1-2.
"Wherify Wireless Breakthrough in Location-Based Services," Mobilemag.com, Feb. 28, 2001, p. 1.
"Wherify Wireless GPS Locator for Kids User Guide," Wherify Wireless, Inc., 2003, pp. 1-106.
"Wherify Wireless Location Services," Wherify Wireless, Inc., webpages, pp. 1-5 (downloaded: Mar. 25, 2003: www.wherifywireless.com/prod_watches.htm).
"X-GPS™—Hybrid GPS Location Server Solution," Axiom Navigation Inc., 2000-2001 (downloaded Oct. 19, 2002: www.axiomnav.com/Prod_Global/x-gps.asp).
"Yahoo! Messenger—Sending Messages to a Mobile Phone," Yahoo! Messenger, Yahoo! Inc., 2002, pp. 1-7 (downloaded Oct. 27, 2002: http://messenger.yahoo.com/messenger/wireless/pc2sms/tour1.html(through /tour7.html)).
"Yahoo! Messenger for Text Messaging," Yahoo! Messenger, Yahoo! Inc., 2002, pp. 1-10 (downloaded Oct. 27, 2002: http://messenger.yahoo.com/messenger/wireless/smsmsgr/tour1.html (through /tour7.html)).
"Yahoo! Messenger for WAP," Yahoo Messenger, Yahoo! Inc., 2002 (tours 1-9), pp. 1-17 (downloaded Oct. 27, 2002: www.messenger.yahoo.com/messenger/wireless/wap/tour1.html(through /tour9.html)).

Accelerometers—General Purpose, LP Series, Crossbow Technology, Inc., data sheet, pp. 1-3 (downloaded Apr. 11, 2002: www.xbow.com/Products/Accelerometers.htm).
Bickers, "Eyes in the sky," SafeTzone Technology Corporation, webpages, 2001, pp. 1-3 (downloaded: www.safetzone.com/newsKiosk.asp).
Chertkoff, Rachel, "Vehicle Locator Systems," Pager Technology, pp. 1-2, 1998.
Commercial Uses for LoJack (webpage), LoJack Corporation, downloaded Jan. 22, 2000.
Crossbow Product Guide—Accelerometers, Crossbow Technology, Inc., webpages, pp. 1-3 (downloaded Apr. 11, 2002: www.xbow.com/Products/Accelerometers.htm).
Culler et al., *MICA: The Commercialization of Microsensor Motes*, Sensors, vol. 19, No. 4 (Apr. 1, 2002).
Darabi et al., *A 2.4-GHz CMOS Transceiver for Bluetooth*, IEEE Journal of Solid-State Circuits, vol. 36, No. 12 (Dec. 2001).
Delphi and MobileAria Demonstrate True Hands Free In-Vehicle Mobile Productivity Services At CES, Press Release, Delphi Automotive Systems, Jan. 8, 2002 (downloaded Apr. 5, 2002: www.delphiauto.com/news/pressRelease/pr6828-01082002).
F. Rivera, "Special Report: Keeping Tabs on Your Teen," 7 News, Boston, Apr. 30, 2002, pp. 1-3.
FedEx Insight, FedEx, webpages, pp. 1-11 (downloaded Oct. 29, 2002: www.fedex.com).
J. Fraden, Handbook of Modern Sensors, Springer-Verlag (1996).
GPS2000, Omega Research and Development, Inc., webpages, pp. 1-9 (pp. 7-9 pertain to an online tour) (downloaded Jul. 14, 2003: www.gps2000online.com/).
Grimes, Craig A., et al., *Wireless Magnetoelastic Resonance Sensors: A Critical Review*, Sensors (Jul. 23, 2002).
Helfenstein et al. Circuits and Systems for Wireless Communications, Kluwer Academic Publishers (2000).
Hill et al., *System Architecture Directions for Networked Sensors*, ACM/ASPLOS-IX (Nov. 2000).
IMVironment, Yahoo! Messenger Yahoo! Inc., 2002, pp. 1-12 (downloaded (including) Oct. 27, 2002: http://help.yahoo.com/help/us/mesg/imv/imv-01.html(through/index5.html).
J.Wrolstad, "Chrysler Claims First With Bluetooth Mobile Phone System," Wireless Newsfactor, Oct. 26, 2001.
K. Hill "Prada Uses Smart Tags to Personalize Shopping," CRMDaily.com, Apr. 24, 2002, pp. 1-4.
Madou, Marc J., Fundamentals of Microfabrication, CRC Press (2002).
K. Miyake, "Sharp to unveil 3G PDA-type cell phone," ITworld.com, Inc., Jan. 11, 2002.
Kleinknecht, William, "Juvenile authorities want satellite tracking for felons," The Star-Ledger of New Jersey, Nov. 18, 1997.
LoadTrak, pp. 1-2 (downloaded Jun. 4, 2002: www.load-trak.com).
Mainwaring et al., *Wireless Sensor Networks for Habitat Monitoring*, ACM (Sep. 28, 2002).
Marek, "The Unstoppable SnapTrack," Wireless Week, Dec. 18, 2000.
Motorola Consumer Catalog: Pagers (webpage), Motorola, Inc., downloaded Jan. 19, 2000.
My.Roadway!, Roadway Express, Inc., webpages, pp. 1-2, (downloaded Jun. 9, 2002: www.quiktrak.roadway.com/cgi-bin/quiktrak).
Packtrack™, PackTrack.com, webpages, pp. 1-2 (downloaded Jun. 9, 2002: www.packtrack.com).
Precision Accelerometers, PCB Piezoelectronics Products—SVS Division, webpages, pp. 1-2 (downloaded Apr. 11, 2002: www.pcb.com/products/svs/index.html).
Rabinowitz and Spilker, Jr., "A New Positioning System Using Television Synchronization Signals," Rosum Corporation, pp. 1-11 (downloaded May 21, 2003).
Rabinowitz and Spilker, Jr., "Positioning Using the ATSC Digital Television Signal," Rosum Corporation Whitepaper, Rosum Corporation (downloaded May 21, 2003).
Razavi, Behzad, RF Microelectronics, Prentice Hall (1998).
Real Time Locating System, Executive Summary, Technology Systems International, Inc., 2007.

(56) References Cited

OTHER PUBLICATIONS

Rofougaran et al., *A Single-Chip 900-MHz Spread-Spectrum Wireless Transceiver in 1-μm CMOS-Part II: Receiver Design*, IEEE Journal of Solid-State Circuits, vol. 33, No. 4 (Apr. 1998).
Ryan, "Catching up with Dick Tracy," San Francisco Chronicle, news article, Mar. 18, 2002.
SandPiper GPS Receiver, Specification sheet by Axiom Navigation Inc. (www.axiomnav.com) 2006.
Senturia, Stephen D., Microsystem Design, Kluwer Academic Publishers (2001).
Smart Antenna, Specification sheet by Axiom Navigation Inc. (www.axiomnav.com) 2008.
SnapTrack—Privacy Protection (webpage), SnapTrack Inc., downloaded Jan. 19, 2000.
SnapTrack—Technology At Work (webpage), SnapTrack Inc., downloaded Jan. 19, 2000.
SnapTrack in Action (webpage), SnapTrack Inc., downloaded Jan. 19, 2000.
Steyaert et al., "A 2-V CMOS Cellular Transceiver Front-End," *IEEE Journal of Solid-State Circuits*, vol. 25, No. 12, Dec. 2000, pp. 1895-1907.
Stilp, Louis A., "Examining the Coming Revolution in Location Services," pp. 1-11, Mar. 13, 2013.
Strom, Stephanie. "A Wild Sleigh Ride at Federal Express," The New York Times, Dec. 20, 1994.
Swift A2 GPS Receiver, Specification sheet by Axiom Navigation Inc. (www.axiomnav.com) 2010.
Swift B2 GPS Receiver, Specification sheet by Axiom Navigation Inc. (www.axiomnav.com) 2010.
TruePosition Virtual Brochure (webpage), TruePosition, Inc., Mar. 13, 2013.
Wong, "Fishers, golfers join the rush to GPS," San Jose Mercury News, news article, Mar. 25, 2002.
Danger Product Overview, Danger, Inc., date unknown, 5 pgs.
PCV*trak*™ Installation and Operator's Manual, Trimble Navigation, 24623-00 Rev. A, May 1994, pp. 1-259.
"Advanced Traveler Aid Systems for Public Transportation," Final Report, Federal Transit Administration, Sep. 1994, pp. 1-131.
Campbell, Laurel, "SECURITY—Military satellite enlisted to thwart car crime," The Commercial Appeal, Sep. 26, 1996, pp. 5B.
Law, Alex, "Week in Wheels/ . . . From a Driver's Notebook," Newsday, Inc., Sep. 20, 1996, pp. C03.
Cortez, Angela, "Springs police can track thief, vehicles," The Denver Post, Sep. 10, 1996, pp. B-01.
"OnGuard Tracker Nabs Auto Burglar," Global Positioning & Navigation News, vol. 6, No. 16, Aug. 8, 1996.
"OnGuard Tracker Nabs Auto Burglar," Section: Financial News, PR Newswire, Jul. 29, 1996.
Nauman, Matt, "Pressing the Panic Button: Car Security Enters a New Age with Cellular Phones and Satellites that Watch Over You," San Jose Mercury News, Jun. 21, 1996, pp. 1G.
"Monday Briefing" San Antonio Express—News, p. 1, Part B, Jun. 10, 1996.
"OnGuard Tracker Makes Debut on 'One Lap of America'," PR Newswire, Jun. 7, 1996.
"OnGuard Tracker Makes Debut on 'One Lap of America'," Southwest Newswire, Jun. 7, 1996.
Dominguez, Raul, "Women get their day in sun—American Golf planning events nationwide May 18," San Antonio Express—News, Apr. 18, 1996, pp. 2, part B.
"Vehicle Navigation Units Being Measured in Luxury Autos," Global Positioning & Navigation News, vol. 6, No. 7, Apr. 4, 1996.
"Advanced Business Sciences, Inc. Announces Completion of Acquisition of Comguard of Illinois," Business Wire, Aug. 26, 1998.
"Advanced Business Sciences, Inc. Announces Filing With Securities and Exchange Commission," Business Wire, Jun. 25, 1999.
"Advanced Business Sciences, Inc. Announces Preliminary Fourth Quarter 1998 Revenue Results," Business Wire, Feb. 4, 1999.
"Business People Burnsy's Grill Names Two," Omaha World—Herald, Section Business, p. 4M, Oct. 20, 1996.

"Company Sees Prisoner Tracking and Monitoring Market Niche," Global Positioning & Navigation News, vol. 6, No. 10, May 16, 1996.
GPS-Based Personal Monitoring Systems Offered to Corrections, Private Market, Global Positioning & Navigation News, vol. 8, No. 11, Jun. 3, 1998.
GPS tracks parolees, probationers, Corrections Professional, vol. 5, No. 6, Nov. 19, 1999.
High-Tech System Tracks Offenders—Satellites Watching Criminals, Business Wire, Nov. 14, 1997.
BRIEFS, Global Positioning & Navigation News, vol. 9, No. 4, Feb. 24, 1999.
Dunkelberger, Lloyd, "Lawmakers question criminal-tracking system," Sarasota Herald—Tribune (Florida), pp. 16A, Nov. 28, 1999.
Powell, Barbara. "New gadgets help drivers find their way," Fort Worth Star-Telegram (Texas), p. 1, Jan. 20, 1997.
"New Service Lets Corrections Agencies Track Offenders by Satellite," PR Newswire, Jan. 11, 1999.
"New Service Lets Corrections Agencies Track Offenders by Satellite; SecutityLink Offers "GPS" Tracking for Offenders on Electronic Monitoring—Sandusky Municipal Court Adopts Technology for Local Offenders," PR Newswire, Jan. 12, 1999.
"New Service Lets Corrections Agencies Track Offenders by Satellite; SecurityLink Offers 'GPS' Tracking for Offenders on Electronic Monitoring," PR Newswire, Section: Financial News, Jan. 11, 1999.
"New Service Lets Corrections Agencies Track Offenders by Satellite," Satellite Today, vol. 2, No. 8, Jan. 13, 1999.
"Prisoner Security Monitoring Company Grabs Contracts for GPS-Based System," Global Positioning & Navigation News, vol. 7, No. 1, Jan. 15, 1997.
Atwater, Andi, "Proposal seeking 24-hour tracking of all sex offenders," The News—Press (Fort Meyers, FL), pp. 1A, Feb. 20, 2000.
BRIEFS, Global Positioning & Navigation News, vol. 9, No. 3, Feb. 10, 1999.
Brauer, David, "Satellite 'Big Brother' Tracks Ex-Inmates; Agencies Experiment with GPS to Monitor Parolee Whereabouts," Chicago Tribune, Section: News, p. 31, Dec. 18, 1998.
"Satellite Spotlight; Eye in the Sky to Monitor Parolees," Satellite News, vol. 21, No. 15, Apr. 13, 1998.
"Satellite Spotlight: Fighting Crime From Space," Satellite News, vol. 19, No. 20, May 13, 1996.
Prohaska, Thomas J, "Satellite Will Keep Tabs on Convicts," Buffalo News (New York), Section: Local, p. 5B, Sep. 20, 1999.
"Sierra Wireless and Pro Tech Team Up on Monitoring Product," Global Positioning & Navigation News, vol. 8, No. 8, Apr. 22, 1998.
Anderson, Larry, "Technology rules at Securing New Ground," Access Control & Security Systems Integration, Section: Industry Outlook; ISSN 1084-6425, Dec. 1999.
Trimble Navigation Warns 2nd-Quarter Earnings to Miss Target, Dow Jones Business News, Jul. 10, 1998.
"Trimble Navigation's Net Income Skidded 93% Amid Order Delays," Dow Jones Business News, Jul. 23, 1998.
BRIEFS, Global Positioning & Navigation News, vol. 9, No. 2, Jan. 27, 1999.
BRIEFS, Global Positioning & Navigation News, vol. 9, No. 14, Jul. 14, 1999.
Dailey et al. "Automatic Transit Location System," Final Research Report, 55 pgs., Feb. 1996.
Maguire, Jr. et al. "SmartBadges: a wearable computer and communication system," codes/CASHE '98, 47 pgs., 1998.
Koshima et al. "Personal locator services emerge," IEEE Spectrum, Feb. 2000, pp. 41-48.
Zygowicz et al. "State of the Art in Automatic Vehicle Location Systems," Center for Urban Transportation Studies, University of Wisconsin, Milwaukee, Feb. 1998.
Ashworth, Jon. "Big brother is watching you," The Times (London), Section: Features, May 7, 1999.
"Car Thieves Take the "Bait" in Michigan; Two Suspects Reeled in With OnGuard," Business Wire, Sep. 11, 1997.

(56) References Cited

OTHER PUBLICATIONS

Sauer, Matthew, "Company Finds Niche by Giving Directions . . . " Sarasota Herald-Tribune (Florida), Section: Business Weekly, p. 1, Jul. 7, 1997.
"ATX Technologies Signs Nationwide Service Deal with AT&T," Global Positioning & Navigation News, vol. 7, No. 9, May 7, 1997.
"Car Thieves Take the 'Bait' in Tulsa; Two Suspects Caught Off Guard with OnGuard Once Again," PR Newswire, Section: Financial News, Jan. 8, 1997.
"Car Thieves Take the 'Bait' in Tulsa; Two Suspects Caught Off Guard with On Guard," PR Newswire, Section: Financial News, Dec. 9, 1996.
Jackson, Terry, "Smart Cars Whether by Satellite or the Internet, High-Tech Devices and Services May Make Crumpled Road Maps a Thing of the Past," The Miami Herald, Section: Travel, p. 1J, Oct. 6, 1996.
"San Antonio Personal Security Company Links Up with Senior PGA Golfer," PR Newswire, Section: Financial News, Apr. 1, 1996.
"San Antonio Personal Security Company Links Up with Senior PGA Golfer," Southwest Newswire, Apr. 1, 1996.
Business Briefs, San Antonio Express—News, Mar. 25, 1996.
"ATX Research Signs Exclusive Sales Agreement with Arizona Company," PR Newswire, Mar. 21, 1996.
"ATX Research Signs Exclusive Sales Agreement with Arizona Company,"Southwest Newswire, Mar. 21, 1996.
"Automotive GPS Satellite/Safety System Race Is On," Southwest Newswire, Feb. 20, 1996.
"Dealerships Can Track Down New Aftermarket Revenues," PR Newswire, Feb. 9, 1996.
"ATX Research Unveils New Stealthtrac Capability," PR Newswire, Feb. 9, 1996.
"Dealerships Can Track Down New Aftermarket Revenues," Southwest Newswire, Feb. 9, 1996.
BRIEFS, Global Positioning & Navigation News Wire, vol. 6, No. 2, Jan. 24, 1996.
"ATX Research Provides Police Departments With Onguard Personal Security and Vehicle Tracking System," PR Newswire, Jan. 15, 1996.
"ATX Research Provides Police Departments With Onguard Personal Security and Vehicle Tracking System," Southwest Newswire, Jan. 15, 1996.
"ATX Research Relocates to New Corporate Headquarters," PR Newswire, Dec. 12, 1995.
"ATX Research Relocates to New Corporate Headquarters," Southwest Newswire, Dec. 12, 1995.
"Texas invention tracks stolen cars, lets driver call for help," The Vancouver Sun, Oct. 20, 1995.
"San Antonio Company Unveils Satellite/Cellular Personal Security System," PR Newswire, Oct. 3, 1995.
"San Antonio Company Unveils Satellite/Cellular Personal Security System," Southwest Newswire, Oct. 3, 1995.
Notice of Allowance for U.S. Appl. No. 12/924,470, dated Aug. 29, 2013.
Notice of Allowance for U.S. Appl. No. 12/924,470, dated Dec. 19, 2013.
Action Closing Prosecution, U.S. Re-examination No. 95/001,896, dated Aug. 22, 2013.
Response to Action Closing Prosecution and Proposed Amendment Under 37 C.F.R. 1.530 and 1.943, U.S. Re-examination No. 95/001,896, dated Sep. 23, 2013.
Replacement Corrected Claims and Table of Contents, U.S. Re-examination No. 95/001,896, dated Sep. 27, 2013.
Third Party Comments Regarding Patent Owner's Response to Second Action Closing Prosecution and Proposed Amendment, U.S. Re-examination No. 95/001,896, dated Oct. 22, 2013.
Patent Owner's Opposition to Requester's Petition for Review of the Primary Examiner's Entry of Patent Owner's Amendment, U.S. Re-examination No. 95/001,896, dated Oct. 31, 2013.
Patent Owner's Appeal Brief, U.S. Reexamination No. 95/001/896, filed May 19, 2014.
Third-Party Requester's Brief in Cross Appeal, U.S. Reexamination No. 95/001,896, filed May 16, 2014.
Respondent Brief for Cross Appeal (Patent Owner), U.S. Reexamination No. 95/001,896, filed Jun. 19, 2014.
Third-Party Requester's Respondent Brief, U.S. Reexamination No. 95/001,896, filed Jun. 19, 2014.
Examiner's Answer, U.S. Reexamination No. 95/001,896, dated Oct. 31, 2014.
Decision on Petitions, U.S. Reexamination No. 95/001,896, dated Jan. 24, 2014.
Right of Appeal Notice, U.S. Reexamination No. 95/001,896, dated Feb. 7, 2014.
Petition for Inter Partes Review Re U.S. Pat. No. 8,725,165, filed May 30, 2014.
Patent Owner's Preliminary Response, IPR2014-00833, Re U.S. Pat. No. 8,725,165, filed Sep. 9, 2014.
Package, Dictionary.com, http://dictionary.reference.com/browse/package (last accessed Nov. 6, 2013), 3 pgs.
"Package" definition, Oxford English Dictionary (OED) Online, Oxford University Press, Jun. 2014.
"Portable" definition, Oxford English Dictionary (OED) Online, Oxford University Press, Jun. 2014.
SiRF Debuts Revolutionary Architecture and Technologies to Further Drive GPS into the Mainstream, SiRF.com, Aug. 16, 1999 (archived Dec. 22, 1999), http://web.archive.org/web/19991222194810/http:/www.sirf.com/as_prss2_3.htm, 4 pgs.
Office Action for U.S. Appl. No. 13/802,624, dated Nov. 18, 2014.
Patent Owners' Rebuttal Brief, U.S. Reexamination No. 95/001,896, filed Dec. 1, 2014.
Rebuttal Brief (Patent Owner), U.S Reexamination No. 95/001,896, filed Dec. 1, 2014.
FedEx Answer, Affirmative Defenses and Counterclaims, C.A. 4:14-cv-04894-PJH, filed Feb. 2, 2015, pp. 1-9.
Office Action for U.S. Appl. No. 13/802,624, dated May 26, 2015.
Petitioner's Reply Brief, IPR2014-00833, Re U.S. Pat. No. 8,725,165, filed Apr. 21, 2015, pp. 1-22.
Decision on Appeal, U.S. Reexamination No. 95/001,896, dated Sep. 29, 2015.
Capozza, P.T., et al. "A single-chip narrow-band frequency domain excisor for a Global Positioning System (GPS) receiver," IEEE Journal of Solid-State Circuits, vol. 35, Issue 3, 2000, pp. 401-411. Mar. 13, 2013.
Request for Rehearing, IPR2014-00833, Re U.S. Pat. No. 8,725,165, dated Dec. 20, 2015, pp. 1-24.
Final Written Decision, IPR2014-00833, Re U.S. Pat. No. 8,725,165, dated Nov. 20, 2015, pp. 1-28.
Request for Rehearing (Patent Owner), U.S. Reexamination No. 95/001,896, filed Nov. 24, 2015, pp. 1-8.
Third-Party Requester's Response to Patent Owner's Request for Rehearing, U.S. Reexamination No. 95/001,896, filed Dec. 23, 2015, pp. 1-6.
Petition under 37 CFR 1.181 for Review of Decision in ACP Entering Patent Owner's Improper Amendment of the Patent, U.S. Reexamination No. 95/001,896, dated Oct. 7, 2013.
Decision, Institution of Inter Partes Review, IPR2014-00833, Re U.S. Pat. No. 8,725,165, dated Dec. 3, 2014, pp. 1-26.
Patent Owner's Request for Rehearing, IPR2014-00833, Re U.S. Pat. No. 8,725,165, filed Dec. 17, 2014, pp. 1-16.
Patent Owner's Response, IPR2014-00833, Re U.S. Pat. No. 8,725,165, filed Feb. 18, 2015, pp. 1-49.
Decision, Patent Owner's Request for Rehearing, IPR2014-00833, Re U.S. Pat. No. 8,725,165, dated Feb. 20, 2015, pp. 1-8.
Decision on Patent Owner's Request for Rehearing, IPR2014-00833, Re U.S. Pat. No. 8,725,165, dated Feb. 12, 2016, pp. 1-11.
Notice of Allowance for U.S. Appl. No. 13/802,641, dated Jun. 16, 2016.
Patent Owner's Request to Expunge Comments, U.S. Appl. No. 95/001,896, filed Nov. 13, 2012.
Third-Party Requester's Opposition to Patent Owner's Request to Expunge Comments, U.S. Appl. No. 95/001,896, filed Nov. 27, 2012.
Patent Owner's Opposition to Entry of Declaration, U.S. Reexamination No. 95/001,896, dated Dec. 6, 2013.

(56) References Cited

OTHER PUBLICATIONS

Third Party Requester's Opposition to Patent Owner's Request to Expunge Prior Art and Expert Declaration, U.S. Reexamination No. 95/001,896, dated Dec. 18, 2013.
Decision on Request for Rehearing, U.S. Reexamination No. 95/001,896, dated Apr. 1, 2016.
Patent Owner's Notice of Appeal, U.S. Reexamination No. 95/001,896, dated May 26, 2016.
Petition to Proceed with CAFC Appeal or to Reissue Board Decision, U.S. Reexamination No. 95/001,896, dated Jul. 5, 2016.
Third Party's Response in Opposition to Patent Owner's Petition to Proceed with CAFC Appeal, U.S. Reexamination No. 95/001,896, dated Aug. 2, 2016.
Decision Expunging Improper Documents in Inter Partes Reexamination, U.S. Reexamination No. 95/001,896, dated Aug. 12, 2016.
Memorandum and Order, U.S. Reexamination No. 95/001,896, dated Oct. 3, 2016.
Decision on Petitions, U.S. Reexamination No. 95/001,896, dated Apr. 4, 2017.
Notice of Intent to Issue Reexam Certificate, U.S. Reexamination No. 95/001,896, dated Jul. 11, 2017.
Notice of CAFC Order to Consider Petition (Patent Owner), U.S. Reexamination No. 95/001,896, dated Oct. 6, 2016.
Decision & Judgement (Rule 36), CAFC Appeal No. 2016-1911, May 9, 2017.
Reply Brief of Appellant, CAFC Appeal No. 2016-1911, Oct. 20, 2016.
Brief of Appellee, CAFC Appeal No. 2016-1911, Oct. 6, 2016.
Brief of Appellant, CAFC Appeal No. 2016-1911, Jul. 27, 2016.
Office Action for U.S. Appl. No. 15/933,578, dated Apr. 12, 2019.
Office Action for U.S. Appl. No. 15/933,578, dated Aug. 7, 2019.
Bahl et al. "Radar: An In-Building RF-based User Location and Tracking System," *Proc. of the IEEE Conf. on Comp. Comm., INFOCOM2000, 19$^{th}$ Annual Joint Conf. of the IEEE Computer and Communications Societies*, Mar. 2000, 10 pgs.
Benefon Esc! Owner's Manual, Publication number: YZ2400-4*, © Benefon Oyj, 2002, pp. 169.
Heinrichs et al. "Synergies in Handset Architecture," *GPS World*, Mar. 2002, vol. 13, Issue 3, p. 30-39.
Hightower et al. "Location Systems for Ubiquitous Computing," *Computer*, Aug. 2001, vol. 34, Issue 8, p. 57-66.
LaMance et al. "Assisted GPS," *GPS World*, Mar. 2002, vol. 13, Issue 3, p. 46-51.
Palenchar, J. "E911 Update: What Major Carriers Have Planned," *Twice: This Week in Consumer Electronics*, Oct. 8, 2001, vol. 16, Issue 23, p. 36.
Syrjarinne, J. "Keeping Time with Mobiles," *GPS World*, Jan. 2001, vol. 12, Issue 1, p. 22, 7pgs.
Van Diggelen et al. "Indoor GPS," *GPS World*, Sep. 2001, vol. 12, Issue 9, p. 50. 5pgs.

NOTIFICATION SETUP

NOTIFICATION CHANNEL:

☐ EMAIL  ☐ PAGE  ☐ FAX

602

DESTINATION(S):

[                    ]

604

NOTIFICATION CRITERIA: 606

☐ POSITION
- ☐ PERIODIC, EVERY [DAY ▼]
- ☐ DISTANCE, EVERY [100 Mi ▼]

☐ ON-DELIVERY
- ☐ DELIVERED   ☐ IMPENDING DELIVERY

☐ CONDITIONS
- ☐ PERIODIC, EVERY [DAY ▼]
- ☐ EXTREME CONDITIONS
  - ☐ TEMPERATURE > [   ] °F
  - ☐ FORCE > [   ] LBS

FIG. 6

METHOD AND SYSTEM FOR PROVIDING SHIPMENT TRACKING AND NOTIFICATIONS

CROSS REFERENCE TO RELATED APPLICATIONS

This application is a Continuation of U.S. patent application Ser. No. 12/924,470, filed Sep. 27, 2010, and entitled "METHOD AND SYSTEM FOR PROVIDING SHIPMENT TRACKING AND NOTIFICATIONS," now U.S. Pat. No. 8,725,165, which is hereby incorporated herein by reference, which in turn is a Continuation of U.S. patent application Ser. No. 11/732,581, filed Apr. 3, 2007, and entitled "METHOD AND SYSTEM FOR PROVIDING SHIPMENT TRACKING AND NOTIFICATIONS," now U.S. Pat. No. 7,809,377, which is hereby incorporated herein by reference, which in turn is a Continuation of U.S. patent application Ser. No. 10/397,637, filed Mar. 26, 2003, and entitled "METHOD AND SYSTEM FOR PROVIDING SHIPMENT TRACKING AND NOTIFICATIONS," now U.S. Pat. No. 7,212,829, which is hereby incorporated herein by reference. U.S. patent application Ser. No. 09/797,517, filed Feb. 28, 2001, and entitled "METHOD AND SYSTEM FOR LOCATION TRACKING," now U.S. Pat. No. 7,366,522, is hereby incorporated herein by reference.

By way of prior U.S. patent application Ser. No. 10/397,637, this application also claims benefit of: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

This application is also related to: (i) U.S. patent application Ser. No. 10/397,473, filed Mar. 26, 2003, and entitled "METHOD AND APPARATUS FOR INTELLIGENT ACQUISITION OF POSITION INFORMATION," now U.S. Pat. No. 6,975,941; (ii) U.S. patent application Ser. No. 10/397,472, filed Mar. 26, 2003, and entitled "Methods and Apparatus to Analyze and Present Location Information;" (iii) U.S. patent application Ser. No. 10/397,641, filed Mar. 26, 2003, and entitled "METHOD AND SYSTEM FOR PERSONALIZED MEDICAL MONITORING AND NOTIFICATIONS THEREFOR;" (iv) U.S. patent application Ser. No. 10/397,640, filed Mar. 26, 2003, and entitled "INEXPENSIVE POSITION SENSING DEVICE;" (v) U.S. patent application Ser. No. 10/397,474, filed Mar. 26, 2003, and entitled "METHOD AND SYSTEM FOR ENHANCED MESSAGING;" (vi) U.S. patent application Ser. No. 10/397,512, filed Mar. 26, 2003, and entitled "APPLICATIONS OF STATUS INFORMATION FOR INVENTORY MANAGEMENT."

BACKGROUND OF THE INVENTION

1. Field of the Invention

The present invention relates to shipment of objects and, more particularly, to monitoring objects during shipment.

2. Description of the Related Art

Objects are regularly shipped from a sender to a recipient. The objects can be packages, containers or boxes, or items within packages, containers or boxes. However, for the most part, once an object leaves the sender and enters a shipping channel, the sender and recipient have little or no knowledge about the shipments.

Recently, shipping companies, such as Federal Express, have enabled users to track shipments using tracking numbers uniquely assigned to the objects being shipped. A user can access the FedEx.com website and retrieve tracking information about a particular package or can arrange to have such tracking information emailed to a particular email address. The tracking information can include such information as shipment date, delivery location, delivery date/time, person acknowledging receipt, and scan activity. The scan activity provides a listing of each of the locations (and date and time) during the shipment where the package was scanned. Even more recently, FedEx introduced a Web-based business tool, referred to as FedEx InSight, to help businesses manage their shipping activities. FedEx InSight is advertised as facilitating: (i) tracking inbound, outbound and third-party payor shipments; (ii) providing notifications of critical shipping events via electronic mail, facsimile, Internet or wireless means; (iii) providing status summaries of international and domestic shipments on one report; and (iv) helping to pinpoint customs delays and delivery attempts and then suggesting ways to expedite delivery.

Notwithstanding the recent advances in tracking shipments, there still exists various problems that lead to lack of understanding of shipments activity and conditions. When scanning of packages at various locations during a route of shipment is used to tracking location, personnel must manually perform such scanning. Further, the location of packages is only known at the time that the packages are scanned at certain locations (scanning locations). In shipping a package, there is a need to have more precise and robust knowledge of the position and condition of the package throughout the shipping process.

SUMMARY OF THE INVENTION

Broadly speaking, the invention relates to improved approaches for monitoring status of articles being shipped. The monitoring can produce notifications to interested parties. The notifications typically contain status information pertaining to the articles being shipped. Alternatively, interested parties can gain access to status information pertaining to the articles being shipped via a website. According to one embodiment, the status information includes at least position (location) information and shipping conditions information. The invention can be implemented in numerous ways including, a method, system, device, graphical user interface, and a computer readable medium.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 6 is a representative notification setup screen according to one embodiment of the invention.

DETAILED DESCRIPTION OF THE INVENTION

The invention relates to improved approaches for monitoring status of articles being shipped. The monitoring can produce notifications to interested parties. The notifications typically contain status information pertaining to the articles being shipped. Alternatively, interested parties can gain access to status information pertaining to the articles being shipped via a website. According to one embodiment, the status information includes at least position (location) information and shipping conditions information.

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of this aspect of the invention are discussed below with reference to FIGS. 1-9. However, those skilled in the art will readily appreciate that the detailed description given herein with respect to these figures is for explanatory purposes as the invention extends beyond these limited embodiments.

Figure 1:
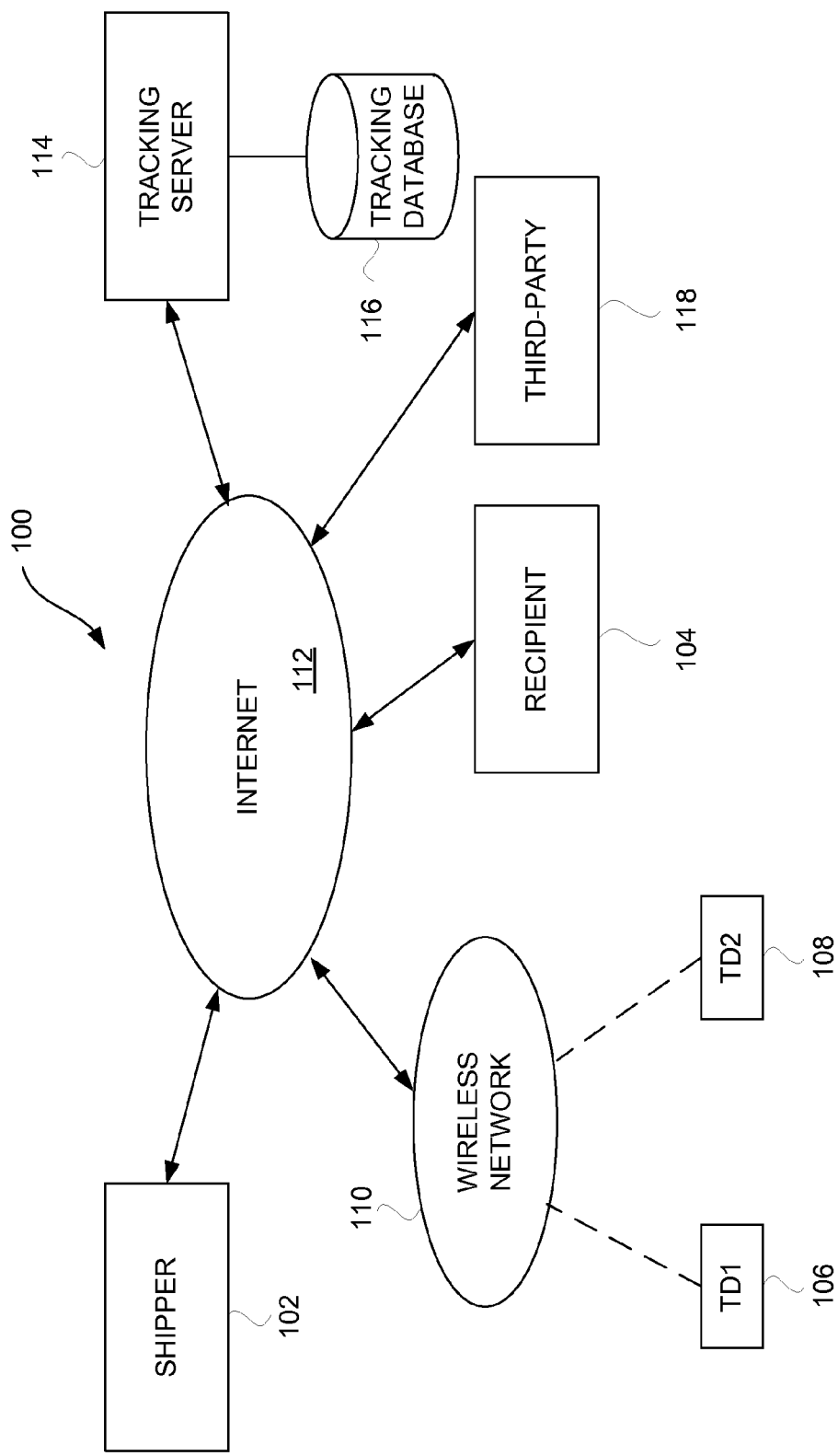
FIG. 1 is a block diagram of an article shipment notification system according to one embodiment of the invention.

FIG. 1 is a block diagram of an article shipment notification system 100 according to one embodiment of the invention. The article shipment notification system 100 provides web-based article shipment management capable of not only tracking the shipment of articles but also providing notifications to users of the system.

The article shipment notification system 100 includes a shipper 102 and a recipient 104. Typically, the article shipment notification system 100 would support multiple shippers and multiple recipients. However, in the embodiment shown in FIG. 1, only the shipper 102 and the recipient 104 are illustrated. It is assumed that an article is being shipped by the shipper 102 to the recipient 104. A shipper is a person, entity or associated computing device that is responsible for or associated with shipping an article, and a recipient is a person, entity or associated computing device to which the article is being shipped.

In order to track the location and shipping conditions of the article being shipped from the shipper 102 to the recipient 104, a tracking device (TD1) 106 is provided within or attached to the article being shipped. Additionally, a second tracking device (TD2) 108 is also illustrated in FIG. 1 which could be used to track another article. The first tracking device 106 and the second tracking device 108 are coupled to a wireless network 110. In general, the article shipment notification system 100 supports many different tracking devices. Typically, for each article being tracked, the article shipment notification system 100 would use a separate tracking device.

The wireless network 110 is coupled to the Internet 112. Further, a tracking server 114 is coupled to the Internet 112. The tracking server 114 also couples to a tracking database 116. The Internet 112 can be replaced by other data networks (e.g., enterprise network, regional network, Local Area Network, or Wide Area Network).

While an article is being shipped from the shipper 102 to the recipient 104, the first tracking device 106 gathers status information associated with the article. The status information includes at least position (location) information and/or shipping conditions information. The position information is obtained typically from a global positioning system (GPS) receiver within the first tracking device 106. The position information can be obtained or augmented by a local positioning system such as utilized with a local network (e.g., Bluetooth, Wi-Fi, etc.). The shipping conditions information pertains to conditions of or surrounding an article during its shipment. The shipping conditions information can vary with application. Examples of shipping conditions that can be provided within shipping conditions information include one or more of vibration, acceleration, speed, or direction of travel of, or force or pressure on, the article. Other examples of shipping conditions that can be provided within shipping conditions information include one or more of temperature, humidity, pressure, gaseous or liquid states, chemical compositions, wind speed, color composition, scent, light, sound, smoke, particle or radiation (e.g., infrared radiation).

The status information that is obtained by the first tracking device 106 is sent by the first tracking device 106 to the tracking server 114 via the wireless network 110 and the Internet 112. The tracking server 114 stores the status information pertaining to the first tracking device 106 into the tracking database 116 such that it is associated with the particular article being shipped. The tracking server 114 tracks the shipment of various articles, and thus stores status information pertaining to the particular articles being shipped.

As the article is being shipped, the tracking server 114 can also monitor the status information associated with the first tracking device 106 (as well as other tracking devices used with the article shipment notification system 100). The tracking server 114 can produce and send various notifications to shippers and/or recipients of articles being shipped using the article shipment notification system 100. More particularly, the tracking server 114 can monitor the status information provided by the first tracking device 106 and determine whether and when to send notifications to either the shipper 102 or the recipient 104, or both.

In one embodiment, the shipper 102 and/or the recipient 104 can provide notification criteria to the tracking server 114. The shipper 102 and the recipient 104 are coupled to the Internet 112 and thus can supply notification criteria to the tracking server 114 (as well as receive notifications from the tracking server 114). The notification criteria can specify the channel, timing and nature of the notifications to be received. The notification messages can be transmitted through different channels, such as electronic mail, text message (e.g., page, instant message, etc.), voice call, and facsimile. The timing, for example, can be periodic (e.g., daily) or on events or conditions. The nature of the notification messages can vary based on circumstances and/or user preferences. For example, the user might only desire urgent messages and not messages of lesser priorities. As another example, the user might want to receive messages in an abbreviated format as opposed to a detailed format. As still another example, the user might want to receive warning messages or messages indicating that corrective action is suggested, but opt not to receive regular status messages. In one embodiment, the notification criteria can also be considered user configuration data.

The article shipment notification system 100 can allow the shipper 102 and the recipient 104 to interact with the tracking server 114 through a web interface so that such users are able to configure or set-up to receive certain notifications. The web interface can facilitate a user in arranging to receive notifications by indicating notification criteria. For example, through use of the web interface, a user can make user selections to indicate the notifications to be received and where and by what channels the notifications are to be provided.

The article shipment notification system 100 can provide various different notifications to interested users, such as the shipper 102 and the recipient 104. For example, the shipper 102 might receive a notification that the article shipment has been delayed, a notification that the article has been delivered (arrived at the destination), a notification that shipping conditions violations have occurred, or a notification of the position of the article. For example, the recipient 104 might receive notifications such as a notification that an article has been shipped identifying the recipient as the person or entity receiving the article, a notification that an article being shipped to the recipient is nearby, and a notification that an article will be delivered to the recipient shortly (optionally including an estimated delivery time), a notification of shipping conditions violations, or a notification of the position of the article.

The article shipment notification system 100 can also include at least one third-party 118. The third-party 118 is a user interested in the shipment of the article other than the shipper 102 or the recipient 104. The article shipment notification system 100 can operate (or be configured to operate) to provide certain notifications to the third-party 118. The above-mentioned web interface can be used to configure or set-up such notifications. As examples, the third-party 118 can represent a shipping entity, an insurance company, a management organization, a financial organization, etc.

In one embodiment, the notifications can have different levels. The level of a notification can depend on security clearance, authorization, ranks within companies, or the recipient. For example, a notification directed to an insurance company might contain all available status information. In another example, a notification directed to a recipient of the article might only contain selected types/portions of status information (e.g., time of arrival but not humidity information).

The notification can be initiated by a server, such as the tracking server 104, or on-demand by a requestor (e.g., interested user).

Figure 2:
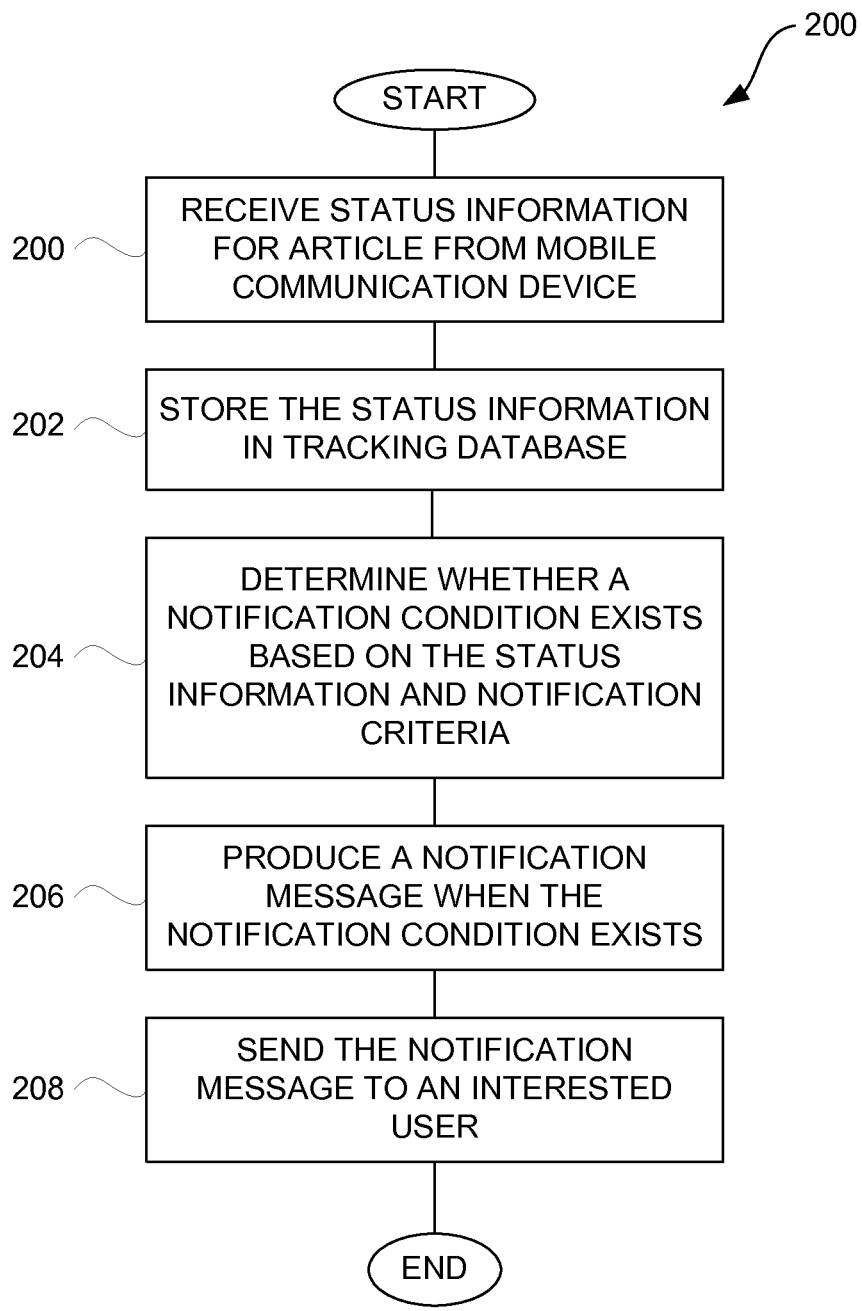
FIG. 2 is a flow diagram of article shipment notification processing according to one embodiment of the invention.

FIG. 2 is a flow diagram of article shipment notification processing 200 according to one embodiment of the invention. The article shipment notification processing 200 can, for example, be performed by a server machine, such as the tracking server 114 illustrated in FIG. 1.

The article shipment notification processing 200 receives 201 status information for an article from a mobile communication device. Here, the mobile communication device transmits the status information for the article that is associated with (e.g., coupled to or encloses) the mobile communication device. The status information that is being transmitted is received at the server by way of a wireless and/or wired network. Next, the status information is stored 202 to a tracking database. The tracking database allows the status information for the article to be organized for subsequent evaluation. The article shipment notification processing 200 then determines 204 whether a notification condition exists based on the status information and notification criteria. The status information for the article was received from the corresponding mobile communication device and stored in the tracking database as noted above. The notification criteria can be either default notification criteria or user-specified notification criteria. In any case, the status information and the notification criteria are utilized to determine whether a notification condition exists. Thereafter, a notification message is produced 206 when the notification condition exists. After the notification message is produced 206 the notification message is sent 208 to an interested user. The manner by which the notification message is sent 208 can vary depending upon the nature of the notification message, the capabilities of the communication system being used, the preferences of the interested user, and the like. After the notification message has been sent 208, the article shipment notification processing 200 is complete and ends.

Figure 3:
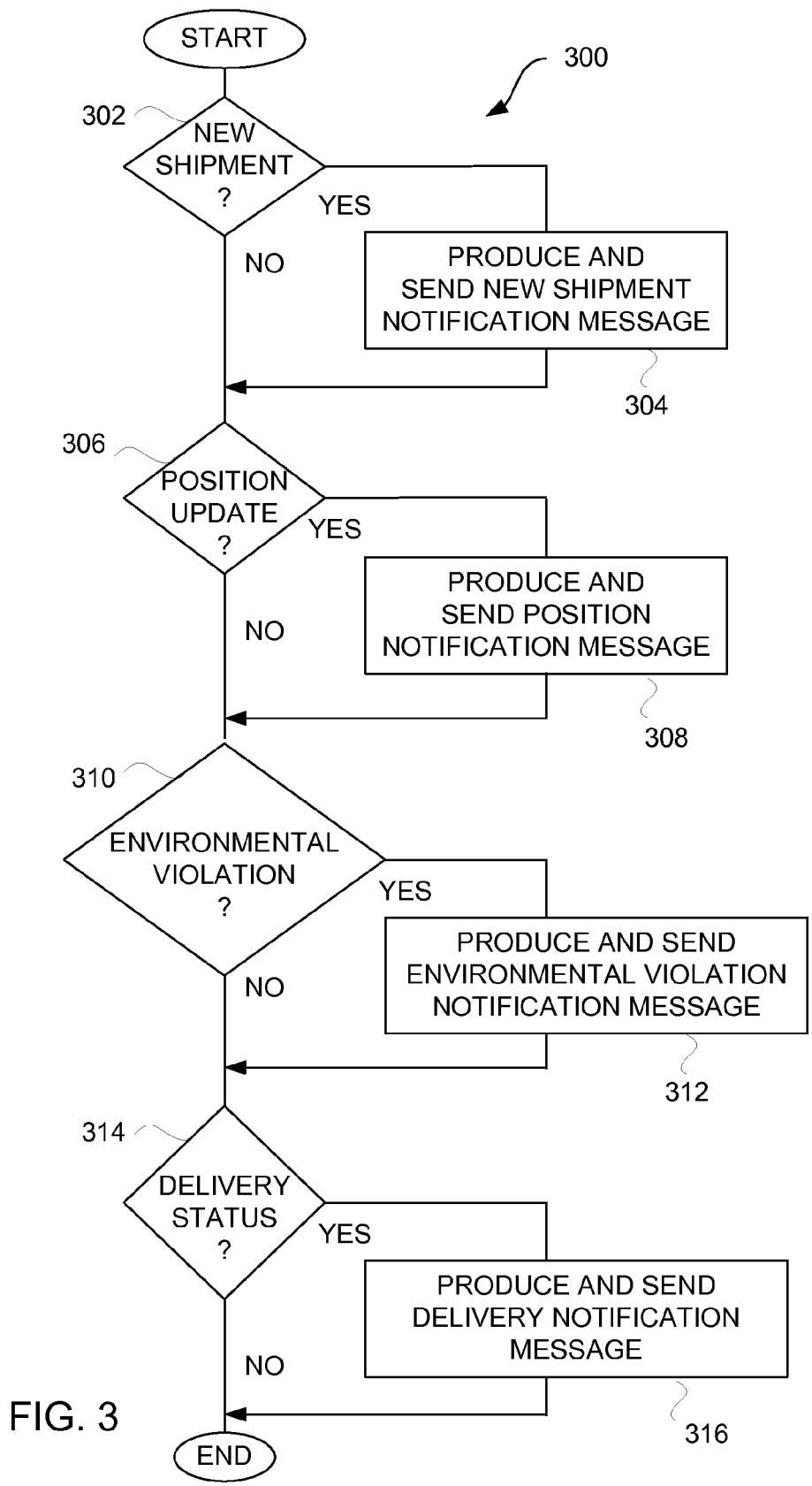
FIG. 3 is a flow diagram of notification message processing according to one embodiment of the invention.

FIG. 3 is a flow diagram of notification message processing 300 according to one embodiment of the invention. The notification message processing 300 can, for example, represent a more detailed implementation for the operations 206 and 208 illustrated in FIG. 2.

The notification message processing 300 assumes that the notification system supports the various types of notifications and distinguishes those notifications based on the existence of particular notification conditions. More specifically, the notification conditions being processed by the notification message processing 300 include, for example, notification conditions pertaining to a new shipment, a position update, an environmental violation, and a delivery status.

The notification message processing 300 begins with a decision 302 that determines whether a new shipment notification condition exists. As an example, a new shipment notification condition is a notification condition that is used to indicate that a new shipment is or has been sent. The new shipment notification condition might notify a recipient that an article was shipped to them on a particular date, from a particular person, and possible also indicate the approximate arrival date and/or time. Still further, in one embodiment, the new shipment notification message can include a link (e.g., hyperlink) to a server location wherein notifications can be arranged. When the decision 302 determines that a new shipment notification condition does exist, then a new shipment notification is produced and sent 304. Alternatively, when the decision 302 determines that a new shipment notification condition does not exist, then a decision 306 determines whether a position update notification condition exists. When the decision 306 determines that a position update notification condition exists, then a position notification message is produced and sent 308. On the other hand, when the decision 306 determines that a position update notification condition does not exist, then a decision 310 determines whether an environmental violation notification condition exists. When the decision 310 determines that an environmental violation notification condition does exist, then an environmental notification message is produced and sent 312. As an example, an environmental notification message informs the recipient of the message that one or more environmental violation notification conditions have been violated. For example, the environmental notification message might indicate that the temperature of the article has exceeded a desired limit, that the humidity has exceeded a desired limit, or that the article has undergone excessive forces. Alternatively, when the decision 310 determines that an environmental violation notification condition does not exist, then a decision 314 determines whether a delivery notification condition exists. When the decision 314 determines that a delivery notification condition does exist, then a delivery notification message is produced and sent 316. On the other hand, when the decision 314 determines that a delivery notification condition does not exist, then as well as following the operation 316, a notification message processing 300 is complete and ends.

It should be noted that the notification message processing can send one or more notifications to an interested user at any point in time. Additionally, the multiple notifications can be combined into a single notification. Further, additional notification conditions beyond those discussed with respect to the notification message processing 300 shown in FIG. 3 can also be utilized and processed in a similar manner. Still further, the organization or arrangement of the processing of the notification message processing 300 shown in FIG. 3 is illustrative and thus not required. For example, the order of evaluating the decisions is not limited to that shown in FIG. 3. In other words, the notification message processing 300 can vary with implementation.

As an illustration regarding notification, the shipping conditions information can provide chemical related feedback or notification information based on chemical substances being sensed within the package or object being shipped. For example, a chemical sensor can be provided within the mobile tracking device to sense chemical compositions (e.g., gaseous components).

With respect to the notification criteria utilized to determine when notifications are to be sent, a user can configure those notifications desired and the particular conditions for such notifications. For example, a user can configure notifications by interacting with a web site to set the notification criteria.

Although the notifications often are sent to the sender or recipient of the package or article being shipped, the notifications can also be sent or forwarded to third parties. One particular third party is, for example, an insurance representative. The notification can indicate that certain shipping conditions have been violated. The notification can also provide instructions or recommendations to take corrective action. The corrective action can, for example, include fixing the problem that caused the shipping conditions violation or mitigating damages caused by the shipping conditions violation.

Figure 4:
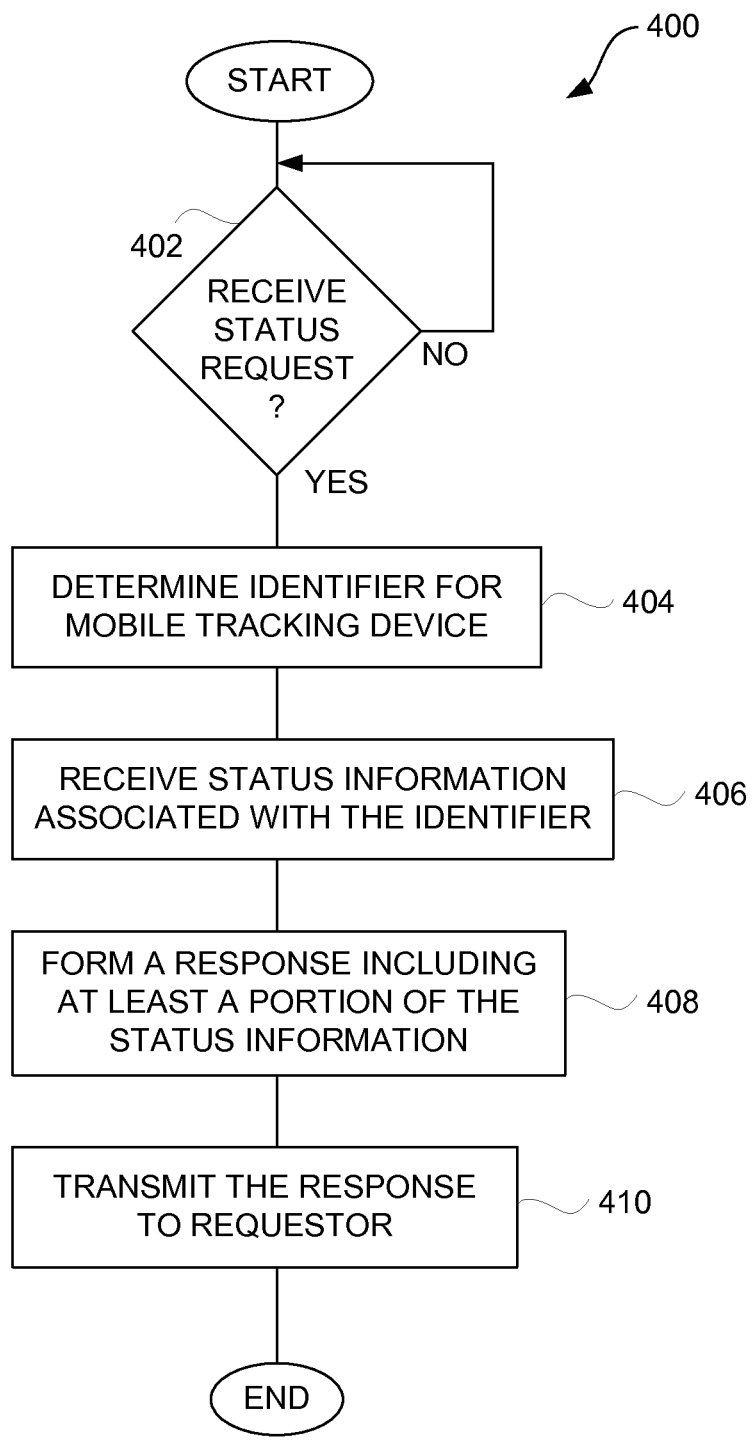
FIG. 4 is a flow diagram of requested notification processing according to one embodiment of the invention.

FIG. 4 is a flow diagram of requested notification processing 400 according to one embodiment of the invention. The requested notification processing 400 is, for example, performed by a server machine, such as the tracking server 114 illustrated in FIG. 1.

The requested notification processing 400 begins with a decision 402 that determines whether a status request has been received. When the decision 402 determines that a status request has not been received, the requested notification processing 400 awaits such a request. In other words, the requested notification processing 400 is invoked when a status request is received. A user (i.e., requestor) typically initiates the requested notification processing 400 when status information is desired by making a status request (or notification request).

Once the decision 402 determines that a status request has been received, then an identifier for the mobile tracking device is determined 404. The identifier serves to identify the particular mobile tracking device for which the status information is to be obtained. After the identifier is identified, status information for the mobile tracking device associated with the identifier is retrieved 406. If desired, the requested notification processing 400 can further determine whether the requestor for the status information is authorized to receive the status information or the level of status information the requestor is authorized to receive.

After the status information has been retrieved 406, a response including at least a portion of the status information is formed 408. In one embodiment, the response being formed 408 is in the format of an electronic mail message (email). For example, if the status request were in the form of an email message (including any text or graphical message being electronically transmitted), the response could be a reply email to the status request email message. In other embodiment, the response being formed 408 can take various other formats. After the response has been formed 408, the response is transmitted 410 to the requestor. The transmission of the response can be over a wireless and/or a wired network. For example, when the format of the response is an email message, the response is typically sent to a network address or email address associated with the requestor that issued the status request. Following the operation 410, the requested notification processing 400 is complete and ends.

Figure 5:
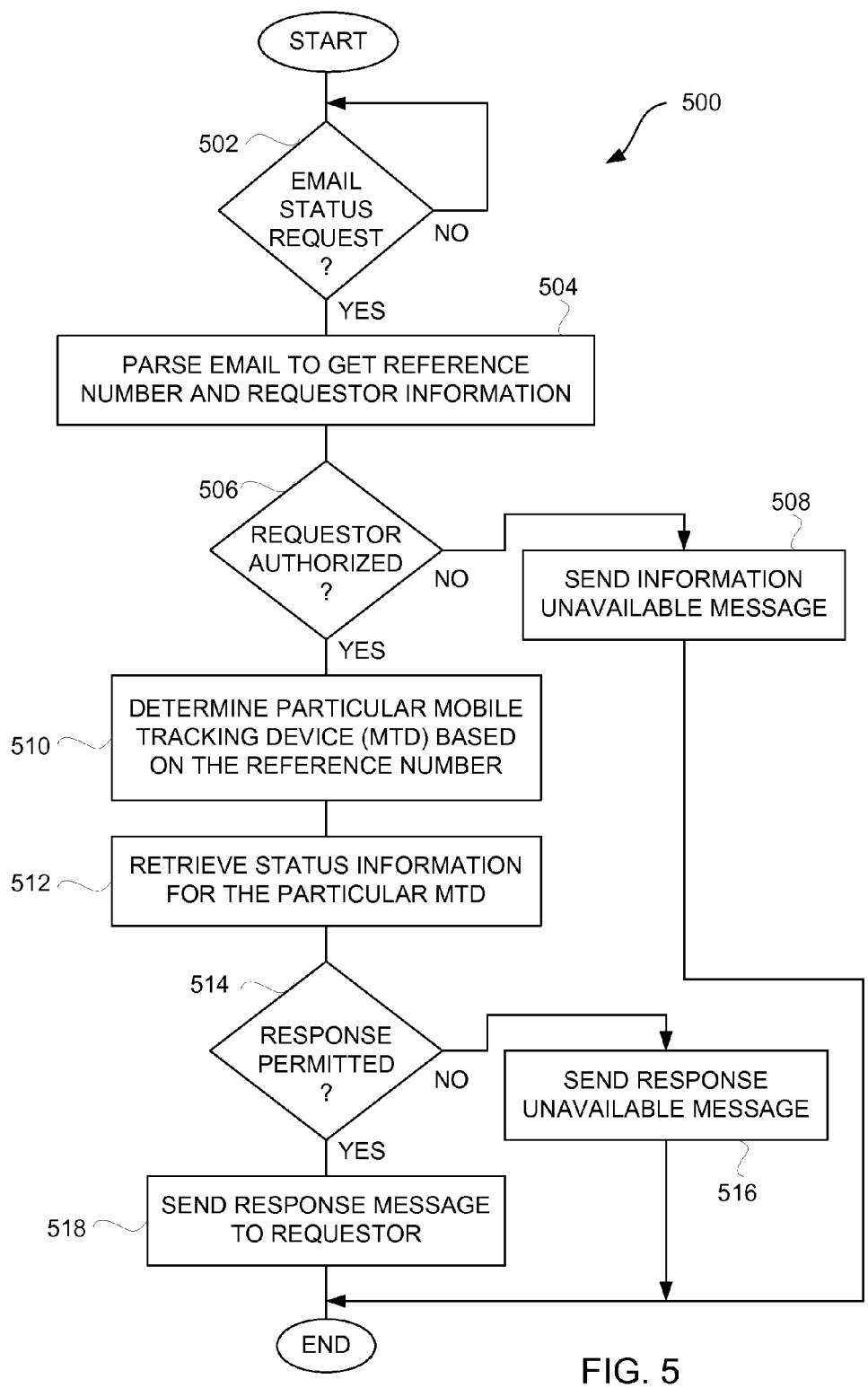
FIG. 5 is a flow diagram of email status processing according to one embodiment of the invention.

FIG. 5 is a flow diagram of email status processing 500 according to one embodiment of the invention. The email status processing 500 is, for example, performed by a server machine, such as the tracking server 114 illustrated in FIG. 1. The email status processing 500 can be considered a more detailed embodiment of the requested notification processing 400 illustrated in FIG. 4.

The email status processing 500 begins with a decision 502 that determines whether an email status request has been received 502 from a requestor. When the decision 502 determines that an email status request has not been received, then the email status processing 500 awaits such a request. Once the decision 502 determines that an email status request has been received, then the email status request is parsed 504 to get a reference number and requestor information.

Next, a decision 506 determines whether the requestor is authorized. Here, the determination of whether or not the requestor is authorized can be performed using some or all of the requestor information and the reference number for the mobile tracking device of interest. When the decision 506 determines that the requestor is not authorized, then an information unavailable reply message is sent 508 to the requestor.

When the decision 506 determines that the requestor is authorized, the mobile tracking device is determined 510 based on the reference number. As an example, the reference number can be an identifier that is used by users to identify the mobile tracking device they are desirous of tracking. Internally the system may use the reference number or another identifier. The reference number may be a fixed number or a re-assignable number that specifies a particular mobile tracking device. For example, the reference number can be a telephone number or network address used by the mobile tracking device for communications.

After the mobile tracking device has been determined 510, the status information for the determined mobile tracking device is retrieved 512. In one embodiment, the status information is retrieved 512 from a database that stores status information for a plurality of mobile tracking devices. The database is, for example, the tracking database 116 illustrated in FIG. 1.

Next, a decision 514 determines whether the requested response is permitted. In other words, although the requestor is permitted to access the status information, the type of response that is permitted to be supplied to the requestor could be limited. Hence, when the decision 514 determines that the requested response is not permitted, then a requested response unavailable message is sent 516 to the requestor. On the other hand, when the decision 514 determines that the requested response is permitted, then a response message is produced and sent 518 to the requestor. In one embodiment, the message can take different formats depending upon a user's configuration requests or the destination for the response. Following the operation 518, as well as following the operations 508 and 516, the email status processing 500 ends.

A web interface (or Graphical User Interface) can be made available to users. The web interface can, among other things, assist a user with configuring notifications for themselves or others. One embodiment of such a web interface is referred to as a notification setup screen.

FIG. 6 is a representative notification setup screen 600 according to one embodiment of the invention. The notification setup screen 600 is, for example, displayed on a display device associated with a user's computer. The notification setup screen 600 would be presented on the display device of the user's computer when the user desires to configure the notification system to provide certain automated notifications. As an example, a network browser application operating on the user's computer can present the notification setup screen 600 and interface thereby with the tracking server 114 to configure the notification system. The user can, for example, be the shipper 102, the recipient 104 or the third-party 118 illustrated in FIG. 1.

The notification setup screen 600 includes a notification format region 602, a notification destination region 604, and a notification criteria region 606. These regions are portions of the notification setup screen which is often a window displayed on a display device as a graphical user interface.

The notification format region 602 is a region that allows the user to select a notification channel (format). In the example, shown in FIG. 6, the user is able to select one of email, page or facsimile as the notification channel. The notification destination region 604 is a region that allows the user to specify one or more destinations. The destination can be an email address, a network address, a telephone number, or a facsimile number. The notification criteria region 606 is a region that allows the user to select, enter or otherwise choose notification criteria. The notification criteria set when and/or what notification are sent to the recipient users. The notification criteria can, for example, enable a user to specify that notifications are to be sent based on position, delivery or other conditions. For example, the notifications regarding position can be configured to be sent periodically (e.g., hourly, daily, weekly, etc.) or based on a distance traversed (e.g., every 1, 5, 10, 50 or 100 miles). For example, the notifications regarding delivery can be configured to be sent on delivery of the article/object to a destination, or when delivery is impending (i.e., article/object is proximate to the destination). For example, the notification regarding conditions of the shipment can be initiated periodically or on-event. In the representative example shown in FIG. 6, the notification can be periodic (e.g., hourly, daily, weekly, etc.) or can be when an extreme condition occurs, such as temperature exceeding a threshold temperature or a force exceeding a threshold amount.

Regardless of how the notification is triggered, the content of the notification could include merely status information about the condition causing the trigger, or could also include other current status information. For example, a periodic position notification could also include other status information besides position information. Likewise, a periodic condition notification could include other condition information (e.g., temperature, force, etc.) as well as position information.

Further, different channels, types or criteria can be used to provide notifications to different recipients. Hence, the notification can be customized for different users, namely, shippers, recipients and third-parties.

The web interface used to configure notification is not limited to the notification setup screen 600 illustrated in FIG. 6. Instead, the web interface can take a variety of different forms. It may use defaults, preferences (e.g., user-specified or inferred from prior actions), or other means to assist the user in interfacing with the web interface.

The notifications provided by the invention can be informative and/or instructive. The informative nature of the notifications reflects the inclusion of status information in the notification. The instructive nature of the notifications can reflect instructions or requests for corrective action to remedy dangerous or unwanted status of the shipment. For example, if a shipment is reaching dangerously high temperatures, the shipping company can be notified of the present or anticipated problem and request corrective action to remedy the situation. Further, the status information history for the shipment of the article can be made available so an interested user can evaluate where a problem occurred, how it occurred, and who was at fault.

When shipping an article, a shipper might insure the shipment. The insurance could, for example, be provided by the shipping entity or a third party. The insurance could insure against certain insured criteria, such as delivery by a deadline, damage to the article, exposure of the article to an unaccepted environmental conditions, etc. Notifications concerning violations (or non-violations) of insured criteria can be automatically provided to interested users.

Figure 7:
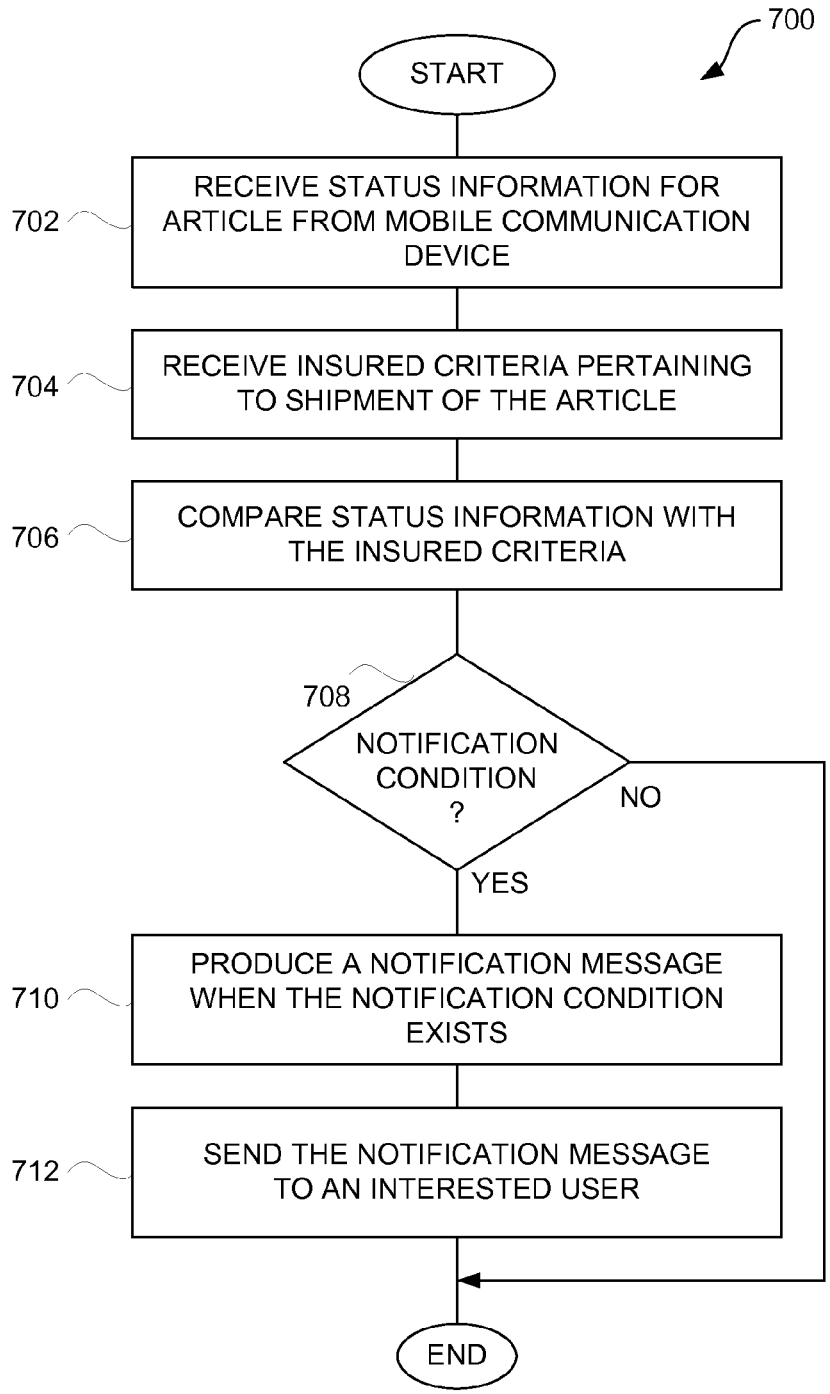
FIG. 7 is a flow diagram of insurance compliance processing according to one embodiment of the invention.

FIG. 7 is a flow diagram of insurance compliance processing 700 according to one embodiment of the invention. The insurance compliance processing 700 can, for example, allow notification messages to be automatically sent to interested users (e.g., shipping entity, shipper, or insurance representative).

The insurance compliance processing 700 receives 702 status information for an article from a mobile communication device. As noted above, at least in one embodiment, the status information includes at least position (location) information and shipping conditions information. In addition, insured criteria pertaining to the shipment of the article is received 704. The insured criteria are typically dependent on insurance policy coverage placed on the article. Next, the status information is compared 706 with the insured criteria. A decision 708 then determines whether a notification condition exists. In one implementation, a notification condition exists when the status information indicates that one or more insured criteria have been breached. In another implementation, an interested user can configure the system to set notification conditions associated with status conditions and insured criteria. When the decision 708 determines that a notification condition exists, then a notification message is produced 710. The notification message is then sent 712 to an interested user. After the notification message is sent 712, the insurance compliance processing 700 is complete and ends. Alternatively, when the decision 708 determines that a notification condition does not exist, then the operations 710 and 712 are bypassed and the insurance compliance processing 700 ends.

In the course of shipping an article, a shipping entity might have agreed to deliver the article to a destination within a prescribed period of time. The failure of the shipping entity to meet this or any other condition can entitle the sender or recipient to a refund of some of all of the costs the sender incurred in shipping the article. Typically, the party that originally paid for the costs of the shipping would normally be the party that receives the refund. The discussion provided below primarily assumes that the sender is the party that would receive any refund, though such is not a limitation.

Figure 8:
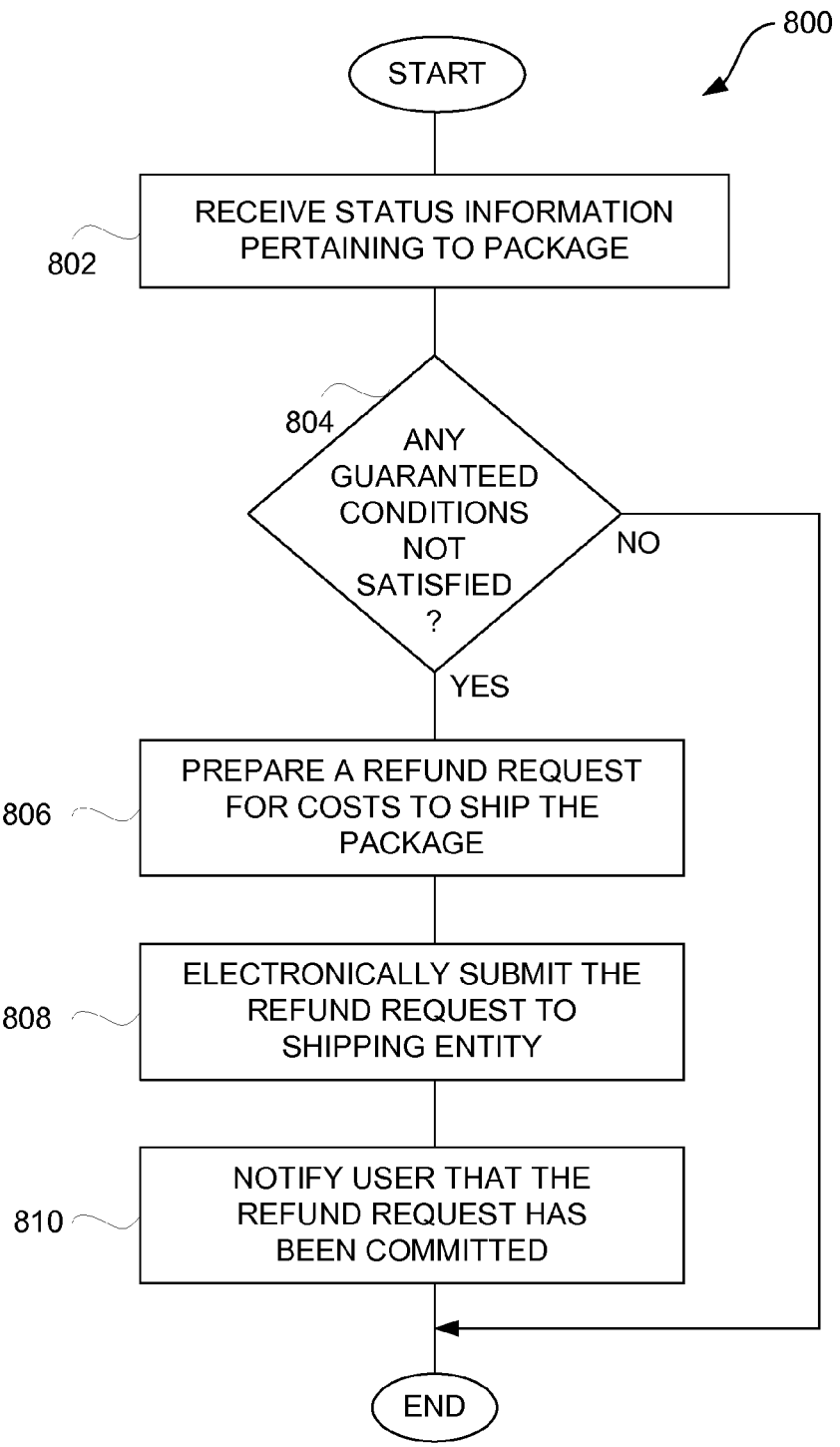
FIG. 8 is a flow diagram of refund processing according to one embodiment of the invention.

FIG. 8 is a flow diagram of refund processing 800 according to one embodiment of the invention. The refund processing 800 serves to automatically request and process refunds on behalf of senders, and their refunds with respect to shipping entities.

The refund processing 800 begins by receiving 802 status information pertaining to a package (i.e., article). The package is being shipped to a recipient. The sender is utilizing a carrier (i.e., shipping entity) to perform the shipping function to deliver the package to the recipient. A decision 804 determines whether there are any guaranteed conditions associated with the shipment that have not been satisfied. Here, the status information can be utilized to determine whether one or more of the guaranteed conditions are not satisfied. The guaranteed conditions are typically associated with a shipping agreement between the sender and the shipping entity. In one embodiment, one guaranteed condition of a shipment is a guaranteed delivery time. When the decision 804 determines that one or more guaranteed conditions of the shipment have not been satisfied, then a refund request is prepared 806 to recover some or all of the cost to ship the package. Next, the refund request is electronically submitted 808 to the shipping entity. The submission to the shipping entity can be done using a general address, a special address associated with refunds, or it could be an agent's address that is utilized to process the refund request for the shipping entity. Further, the electronic submission 808 can be performed through electronic mail, facsimile transmission, or FTP transmission. After the refund request has been electronically submitted 808, the user (sender) is notified 810 that the refund request has been submitted. On the other hand, when the decision 804 determines that all guaranteed conditions have (so far) been satisfied, then the operations 806-810 are bypassed. Following the operation 810, the refund processing 800 is complete and ends.

Additionally, the refund processing could also further monitor the processing of a refund request by the shipping entity. For example, after submission of the refund request, the refund processing can examine whether the refund associated with the refund request has been received. Further, additional monitoring could be performed to determine that the receipt of the refund request has been received, the stage of its processing by the shipping entity, or other refund related information. Furthermore, the user (sender) can be notified when the refund monies have been received. These refund monies can be electronically transmitted to the sender or can be placed in an account that is associated with the sender.

The refund processing can be initiated in a variety of different ways. For example, the refund processing can be triggered by the arrival of the package at its destination. Alternatively, the refund processing could be performed whenever a guaranteed condition is not met, such as the guaranteed delivery time has been exceeded. As yet another alternative, the refund processing can be performed as status information is updated or as processing resources are available.

The invention is suitable for asset management, such as tracking location/position of assets and monitoring conditions of assets. Assets can, for example, include: packages, purchased goods, moving boxes/creates, and pallets.

The position resolution can be enhanced through use of a community layout and/or profile information.

Figure 9:
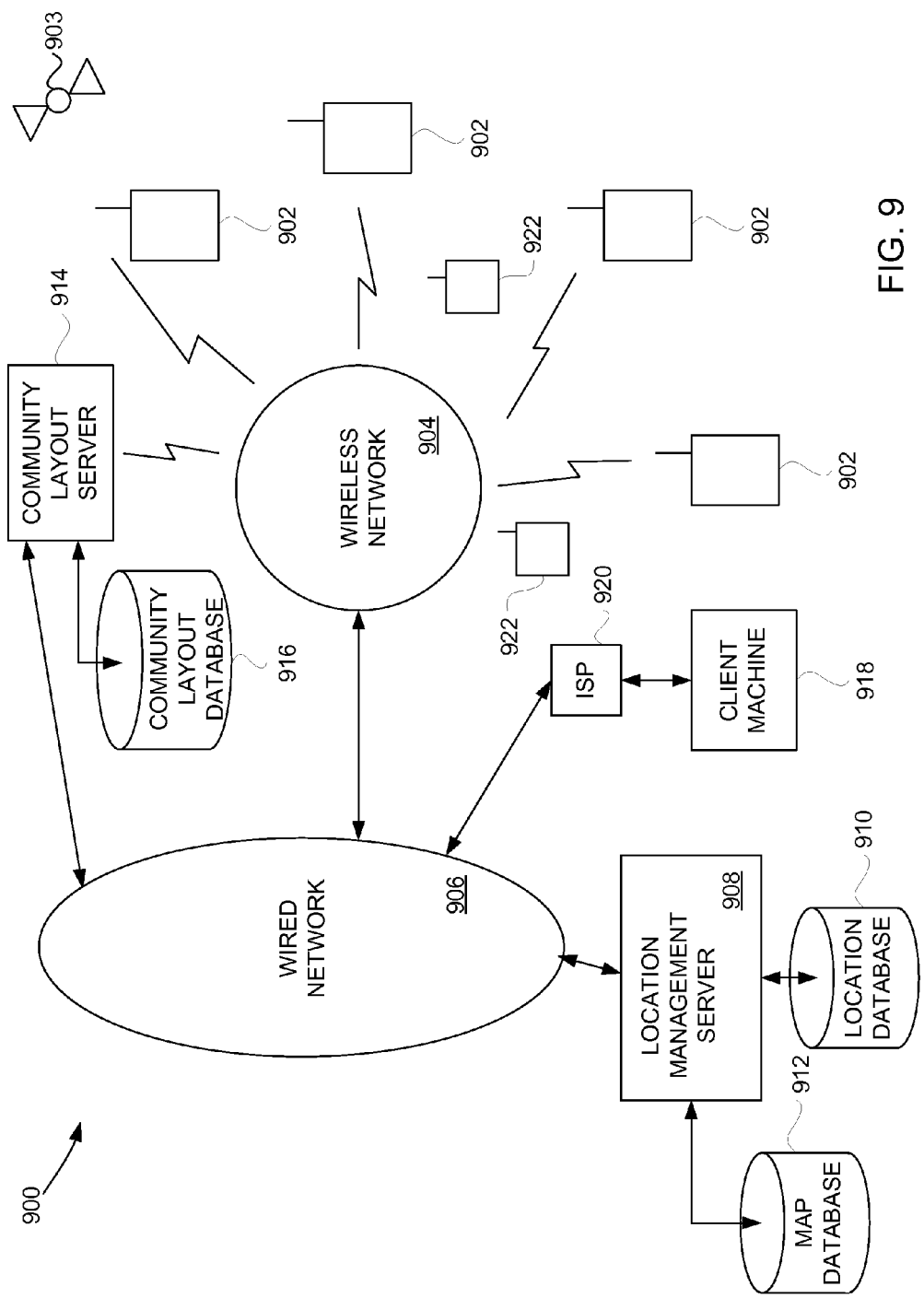
FIG. 9 is a block diagram of an object tracking system according to one embodiment of the invention.

FIG. 9 is a block diagram of an object tracking system 900 according to one embodiment of the invention. The object tracking system 900 can be used to track various objects including packages, humans, pets and the like. The object tracking system 900 includes a plurality of wireless devices 902. These wireless devices 902 are provided with or proximate to objects being tracked by the object tracking system 900. These mobile devices 902 have GPS receivers that can receive GPS position information from a GPS system 903. The acquisition of such position information can be performed on demand, periodically or on need. The mobile devices 902 communicate over wireless links with a wireless network 904. The wireless network 904 then couples to a wired network 906. A location management server 908 is coupled to the wireless network 906. The location management server 908 provides centralized storage of the location information for each of the mobile devices 902 in a location database 910. A map database 912 is also coupled to the location management server 908. The map database 912 can directly connect to the location management server 908 or can reside elsewhere on the wired network 906. The location management server 908 can interact with the map database 912 to convert position information provided by the GPS information into map coordinates, street addresses, etc.

In addition, the object tracking system 900 also includes a community layout server 914. The community layout server 914 can be coupled to the wired network 906 or the wireless network 904. In one embodiment, a community can be associated with a commercial building, a shopping mall, a residential community and the like. The community layout server 914 interacts with a community layout database 916 to resolve locations, such as street addresses and cross streets, into more intelligible locations in a community. For example, instead of a street address, the locations can pertain to points of interest with respect to the community. As an illustration, in the case of a commercial building, with five floors, the community layout database 916 would convert the GPS information (plus any additional sensor information relevant to making the determination also provided by the mobile device 902, such as altitude and direction) to obtain a community location or point of interest. For example, using the GPS position information together with other sensor information, the community layout server 914 can interact with the community layout database 916 to precisely locate a particular mobile device 902 to a particular point of interest. In the case of the commercial building with five floors, the mobile device 902 can be pinpointed to the third floor which pertains to the corporation Acme, Inc. The point of interest or community position can then be sent from the community layout server 914 through the wired network 906 to the location management server 908 which then in turn stores the community position or point of interest in the location database 910 as the position of the particular mobile device 902.

Once the location database 910 has the positions of the mobile devices 902, when subsequent position data is sent to the location management server 908, these positions are suitably updated in the location database 910. Additionally, other of the mobile devices 902 or a representative client machine 918 coupled through an Internet Service Provider (ISP) 920 to the wired network 906 can be permitted to access the locations of one or more of the mobile devices 902. Assuming that the requesting party is allowed access to said position information, the request for such information is processed by the location management server 908. When permission is granted, the locations desired are retrieved from the location database 910 and returned to either the requesting mobile devices 902 or the requesting client machine 918. In a similar manner, access to other non-location information (i.e., additional sensor information or conditions information) pertaining to the mobile devices 902 can be available.

In one embodiment, the client machine 918 or a particular one of the mobile devices 902 can set up a private or semi-private web page that is hosted by a server (e.g., the location management server 908 or other server) on the wired network 906. Then, the page can be customized to monitor the location of a number of the mobile devices 902. Hence, thereafter, the requestor need only access the customized web page to obtain the current position information for such mobile devices. With such an embodiment, a web page could be provided to track a plurality of packages being transported from a warehouse to a customer. In another embodiment, a similar web page can be setup to allow a parent to track the position of mobile devices that are affixed to his children such that the parent can easily monitor the position of his children. In this example, the object tracked is a living being (e.g., person).

The object tracking system 900 could also be augmented by wireless profile devices 922. These profile devices 922 can wirelessly couple to the mobile devices 902 using the wireless network 904. The profile devices 922 could be short range transmitters or transceivers. The profile devices 922 could store one or more profiles for a particular location in which they reside.

Hence, the mobile device 902 can wirelessly communicate with the profile device 922, if available, to acquire a profile pertaining to its location. For example, with the profile device 922 placed in the office building of Acme, Inc., when the mobile device 902 is in such office building, the mobile device 902 can acquire the profile from the proximate profile device 922. The profile can include the business name, its location, contact information for the business, etc. Thereafter, some or all of the profile information can be stored in the mobile device 902 and/or forwarded to the location management server 908 or other server for storage. Hence, the location provided by the profile may be more exacting and descriptive than the GPS position, such that the location of the mobile device 902 can be better determined.

In some cases it may be useful to control or limit the wireless communications with respect to the profile devices 922 so that the mobile devices 902 do not inadvertently receive the wrong profile. Various techniques can be utilized to provide control over the wireless communications. For example, the profile device 922 may or may not use a directional antenna. As another example, the profile device 922 could also control (e.g., limit) its transmission power.

In one embodiment of package tracking and monitoring, a GPS-enabled mobile device is attached to a package. As the package travels, the mobile device periodically sends its position information wirelessly to a center. This can be done, for example, through a cellular connection. The center keeps track of the package's location, and can post its path on a Web site. A user might have to pay to access the location information. For example, at 3 am in the morning, the user can log into the site, and enter a password to find out that the package is on the 9th floor of the Empire State Building (e.g., it destination), or more particularly the package is at the office of Acme, Inc. on the 9th floor of the Empire State Building.

In one embodiment, in addition to position information, other identifying information can also be automatically included based on radio frequency identification (RFID) tags. The RFID tags typically include memory chips equipped and radio antennas. They can be attached to objects (or people) to transmit data about the objects. Typically, the memory chips do not include tremendous amount of information. They may only have 2 kilobytes of data, sufficient to encode, such as a serial number, where and when the product was manufactured, and other relevant information. These tags can come in a number of configurations. For example, an active tag uses a battery-powered transponder to emit a constant signal carrying the identifying information programmed into the chip. Active tags are more applicable to situations where readers are not close to the tags. A semi-passive tag likewise has a battery, but may not be activated until it receives a signal from a reader. They are more applicable to situations that do not need continuous tracking. A passive tag has no battery; its antenna extracts power from the reader's radio wave signal to transmit the identifying information on the chip. Passive tags are typically relatively inexpensive, but may have to be within a few feet of a reader to extract power. The tags can provide identifying information to the corresponding positioning information, which may also include temporal information. Together, the location and identification of assets can be automatically tracked.

In still another embodiment, personalized asset management or object tracking can be provided. For example, a user can track a package or object being shipped at her convenience. Such tracking can be achieved independent of a shipping entity that ships the package. A representative scenario is as follows. A user acquires a location-aware (e.g., GPS-aware) mobile communication device, such as a limited-functionality mobile telephone or 2-way pager, and places the mobile communication device in or on the package or object. The user makes note of the identifier for the mobile communication device. Then, periodically or on-demand, the user can determine the precise location of her package. In one implementation, the user (or a server on the user's behalf) sends a message to the mobile communication object. The message can be a voice or text message, or other form of data, that simply requests the mobile communication device to get its present location. The mobile communication device then determines its location. The mobile communication device can determine its location, for example, by directly using a GPS receiver or indirectly via another device in its immediate vicinity having GPS awareness. Further, battery lifetime can be conserved using the intelligent GPS information acquisition approaches noted in U.S. Provisional Patent Application No. 60/375,998. The mobile communication device then replies back (e.g., through voice or text message) to the user (or server) to inform of its present location. The user can, for example, call or page the mobile communication device and get the reply message. Alternatively, the user need only access the server to access the location data it holds for the package or object associated with the mobile communication device. The server can also automatically track these mobile communication device and alert the users when problems or delays in its transport are identified. Further, alerts or message could notify a recipient or sender of an object or package when the same is determined to be in-route, arrived at and/or proximate to its destination. Besides location, the reply message could also provide other information such as velocity, temperature, humidity, pressure, forces or stresses.

In one embodiment, the mobile device (mobile tracking device or mobile communication device) can include a solar panel. The solar panel can provide electrical power for the mobile device. The solar panel can thus charge a battery used to power the mobile device and/or itself power the mobile device. When the mobile device is affixed to an object (e.g., package) to be shipped, the solar panel can remain at least partially exposed to the outside of the object so as to be able to receive light. The solar panel can be integrated with the housing of the mobile device or can be separate and couple to the mobile device via one or more wires (e.g., a cable).

The present invention has described one or more GPS devices as to identify a location. However, the present invention is not limited to using GPS devices. In certain situations, other wireless or mobile devices can also serve as location-designating devices, such as devices based on GSM technologies or Wi-Fi technologies. Through the techniques of triangulation, these devices can also designate a location. Such triangulation techniques should be known to those skilled in the art.

The mobile device (tracking device or mobile communication device) can be referred to as a position-computing device, and the position-computing device can be very portable. For example, one can easily affix the position-sensing device to a person, package or other object. As examples, the position-computing device can be a personal digital assistant, a pager or a cell phone. The position-sensing device can be made relatively compact. For example, the position-sensing device could be the size of a patch or a card (e.g., memory card or PC Card). A patch can be a structure whose thickness is less than 0.5 inch and whose surface area is less than 2 square inches, or more preferably 1 square inch. The position-sensing device can be one or more of wearable, pager sized or smaller, and pocket sized. The mobile device (e.g., position-sensing device) can also be power by a battery. Additional details can be found in one or more of the following previously incorporated by reference U.S. provisional patent applications: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION;" (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION;" (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION;" and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION."

The above-described systems, devices, methods and processes can be used together with other aspects of an object tracking system, including the various aspects described in: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield different advantages. One advantage of the invention is that interested persons can track and/or be notified as to status of an object. Another advantage of the invention is that status of an object can be monitored such that not only position information but also shipping conditions information are able to be monitored during shipment. Still another advantage of the invention is that status information of an object being transported can be obtained by an interested party (e.g., shipper, recipient or third-party) through notifications or through access to a website (e.g., tracking server).

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for tracking shipment of a package, where a mobile communication device is provided within or coupled to the package and used to track the shipment of the package, the mobile communication device including at least a wireless transmitter, said method comprising:
    receiving status information associated with the package during shipment, the status information being provided by the mobile communication device within or coupled to the package, the status information including at least position information and shipping conditions information, and the shipping conditions information being related to conditions of or around the package being shipped, the shipping conditions information being acquired by one or more sensors included within the mobile communication device, the status information being received wirelessly from wireless transmission initiated from the wireless transmitter included in the mobile communication device;
    accessing, from a storage device, a particular set of notification criteria corresponding to the package, the particular set of notification criteria including at least a first predetermined criterion for a first type of status information and a second predetermined criterion for a second type of status information;
    determining, by one or more computing devices, whether a notification condition pertaining to the package exists based on the status information and the particular set of notification criteria corresponding to the package;
    determining, by the one or more computing devices, a notification message when the notification condition exists; and
    initiating electronically sending the notification message to a user,
    wherein the status information includes the first type of status information, and the notification condition is determined to exist based on a first comparison of the first type of status information with the first predetermined criterion for the first type of status information,
    wherein the status information includes the second type of status information, and the notification condition is determined to exist based on a second comparison of the second type of status information with the second predetermined criterion for the second type of status information, and
    wherein the mobile communication device that acquires the position information and the shipping conditions information is a dedicated, battery- powered, unitary electronic device that is by itself portable, whereby the mobile communication device is capable of being carried by a person without any mechanical assistance.

2. A method as recited in claim 1, wherein the method manages information regarding shipments.

3. A method as recited in claim 2, wherein the method comprises:
    periodically receiving, from the one or more sensors, condition information associated with shipments, the condition information detected by each sensor device and selected based on a device profile;
    associating a sensor information sharing profile with each of a plurality of users; and
    periodically transmitting selected condition information from the one or more sensors to select users based on the sensor information sharing profile associated with each user.

4. A method as recited in claim 3, wherein receiving the condition information comprises receiving information regarding at least one of temperature information, or humidity information.

5. A method as recited in claim 3, wherein the method further comprising triggering an alarm in response to the condition information.

6. A method as recited in claim 5, wherein the triggering comprises triggering the alarm when the sensor devices detect condition information that exceed one or more threshold conditions.

7. A method as recited in claim 1, wherein another notification condition is determined to exist if the position information denotes that a location of the mobile communication device has changed.

8. A method as recited in claim 7, wherein the method tracks shipment of a plurality of packages, and wherein mobile communication devices respectively associated with the packages include one or more sensor devices.

9. A method as recited in claim 8, wherein said method comprises:
    periodically receiving, from the one or more sensors, condition information associated with shipments, the condition information detected by each sensor device and selected based on a device profile.

10. A method as recited in claim 9, wherein said method comprises:
    associating a sensor information sharing profile with each of a plurality of users.

11. A method as recited in claim 10, wherein said method comprises:
    periodically transmitting selected condition information from the sensor devices to select users based on the sensor information sharing profile associated with each user.

12. The method as recited in claim 11, wherein receiving condition information comprises receiving information regarding at least one of temperature information, or humidity information.

13. The method as recited in claim 11, further comprising triggering an alarm in response to the condition information.

14. The method as recited in claim 11, wherein the triggering comprises triggering the alarm when the sensor devices detect condition information that exceed one or more threshold conditions.

15. A method as recited in claim 1, wherein said method permits access to information regarding one or more shipments of packages.

16. A method as recited in claim 15, wherein said method comprises:
receiving, at a tracking center, sensor information associated with the one or more shipments.

17. A method as recited in claim 16, wherein said method comprises:
analyzing rules associated with a user to determine whether the user is authorized to access the received sensor information.

18. A method as recited in claim 17, wherein said method comprises:
restricting the user from accessing the received sensor information based on the analyzed rules, wherein the restricting comprises reporting the received sensor information to the user at a level of specificity that is less than a level of specificity of sensor information collected by a sensor associated with the one or more shipments.

19. A method as recited in claim 17, wherein restricting the user from accessing the received sensor information comprises reporting the received sensor information to the user at a frequency lower than collected by a sensor associated with the one or more shipments.

20. A method as recited in claim 17, wherein the sensor information is collected at a street address or more detailed level and the received sensor information is reported to the user at a city level.

21. A method as recited in claim 17, wherein restricting the user from accessing the received sensor information comprises preventing the user from accessing the received sensor information when one or more sensors associated with the one or more shipments is at a predetermined location.

22. A method as recited in claim 17, wherein restricting the user from accessing the received sensor information comprises preventing the user from accessing the received sensor information at a predetermined time.

23. A method as recited in claim 17, wherein restricting the user from accessing the received sensor information comprises reporting the received sensor information to the user after a predetermined time delay.

24. A method as recited in claim 17, wherein restricting the user from accessing the received sensor information comprises reporting the received sensor information to the user when a sensor associated with the one or more shipments is within a predetermined boundary relative to the delivery location of the one or more shipments.

25. A method as recited in claim 24, wherein the predetermined boundary is defined as either a predetermined distance relative to the delivery location or as a predetermined time to reach the delivery location.

26. A method as recited in claim 17, wherein restricting the user from accessing the received sensor information comprises preventing the user from accessing the received sensor information when a sensor associated with the one or more shipments is outside of a predetermined boundary relative to the originating location of the one or more shipments.

27. A method as recited in claim 26, wherein the predetermined boundary is defined as either a predetermined distance relative to the originating location or as a predetermined time away from the originating location.

28. A method as recited in claim 17, wherein said method comprises:
reconfiguring one or more sensor devices associated with the one or more shipments to modify the frequency or precision of the received sensor information, wherein the reconfiguring occurs in response to an alert created by a reading of the sensor information.

29. A server machine for tracking shipment of a plurality of packages, said server machine comprising:
a non-transitory storage device to store at least computer program code and a set of notification criteria for each of a plurality of mobile electronic devices respectively within or coupled to a corresponding one of the packages; and
at least one processor to perform at least some of the computer program code,
wherein the at least one processor performs at least some of the computer program code to track shipment of the plurality of packages, the computer program code comprises:
computer program code for receiving status information associated with a package during shipment, the status information being provided by the mobile electronic device within or coupled to the package, the status information including at least position information and environmental information, and the environmental information being related to environmental conditions of or around the package being shipped;
computer program code for accessing, from the storage device, the particular set of notification criteria corresponding to the package, the particular set of notification criteria including at least a first predetermined criterion for a first type of status information and a second predetermined criterion for a second type of status information;
computer program code for determining whether a notification condition pertaining to the package exists based on the status information and the particular set of notification criteria corresponding to the package;
computer program code for producing a notification message when the notification condition exists; and
computer program code for initiating electronically sending the notification message to an interested user,
wherein the status information includes the first type of status information, and the notification condition is determined to exist based on a first comparison of the first type of status information with the first predetermined criterion for the first type of status information,
wherein the status information includes the second type of status information, and the notification condition is determined to exist based on a second comparison of the second type of status information with the second predetermined criterion for the second type of status information, and
wherein the mobile electronic device that acquires the position information and the environmental information is a battery-powered, unitary electronic device that is by itself easily portable by a person.

30. A server machine as recited in claim 29, wherein the server machine and the mobile communication device form a system for managing information regarding shipments.

31. A server machine as recited in claim 30, wherein the mobile electronic device includes one or more sensor devices for detecting environmental information associated with the shipments.

32. A server machine as recited in claim 31, wherein the system comprises:
a receiver for receiving the condition information from the at least one sensor device.

33. A server machine as recited in claim 32, wherein the at least one processor:
associates a sensor information sharing profile with each of a plurality of users; and
periodically transmits selected condition information from the sensor devices to select users based on the sensor information sharing profile associated with each user.

34. A server machine as recited in claim 33, wherein the condition information includes information regarding at least one of temperature information, or humidity information.

35. A server machine as recited in claim 33, further comprising an alarm unit which is triggered in response to the received condition information.

36. A server machine as recited in claim 35, wherein the alarm unit is triggered when the sensor devices detect condition information that exceed one or more threshold conditions.

37. A server machine as recited in claim 29, wherein another notification condition is determined to exist if the position information denotes that a location of the mobile electronic device is at a predetermined location that was previously associated with the mobile electronic device.

38. A server machine as recited in claim 37,
wherein the server machine and the mobile electronic device form a system for managing information regarding shipments, and
wherein the system comprises one or more sensor devices for detecting condition information associated with the shipments.

39. A server machine as recited in claim 38, wherein the system comprises:
a receiver for receiving the condition information from the one or more sensor devices.

40. A server machine as recited in claim 39, wherein the at least one processor:
associates a sensor information sharing profile with each of a plurality of users; and
periodically transmits selected condition information from the one or more sensor devices to select users based on the sensor information sharing profile associated with each user.

41. A server machine as recited in claim 40, wherein the condition information includes information regarding at least one of temperature information, or humidity information.

42. A server machine as recited in claim 40, further comprising an alarm unit which is triggered in response to the received condition information.

43. A server machine as recited in claim 42, wherein the alarm unit is triggered when the sensor devices detect condition information that exceed one or more threshold conditions.

44. A method for tracking shipment of a container, where a mobile communication device is provided within or coupled to the container and used to track the shipment of the container, the mobile communication device including at least a wireless receiver and at least one sensor, said method comprising:
receiving status information associated with the container during shipment, the status information being provided by a mobile communication device provided as a single housed device within or coupled to the container, the status information including at least position information and environmental information, and the environmental information being related to an environment of or around the container being shipped, the position information being received or derived from at least data received by the wireless receiver included within the mobile communication device, and the environmental information being received or derived from at least data received from the at least one sensor included within the mobile communication device;
accessing, from a storage device, a particular set of notification criteria applicable to the container, the particular set of notification criteria including at least a first predetermined criterion for a first type of status information and a second predetermined criterion for a second type of status information;
determining, by one or more computing devices, whether a notification condition pertaining to the container exists based on the status information and the particular set of notification criteria associated with the container;
producing, by the one or more computing devices, a notification message when the notification condition exists; and
initiating electronically sending the notification message to an interested user;
wherein the status information includes the first type of status information, and the notification condition is determined to exist based on a first comparison of the first type of status information with the first predetermined criterion for the first type of status information,
wherein the status information includes the second type of status information, and the notification condition is determined to exist based on a second comparison of the second type of status information with the second predetermined criterion for the second type of status information, and
wherein the mobile communication device that acquires the position information and the environmental information is a battery-powered, portable electronic device.

45. A method as recited in claim 44, wherein another notification condition is determined to exist if the position information denotes that a location of the mobile communication device has changed.

46. A server machine for tracking status of a plurality of objects, said server machine comprising:
a non-transitory storage device to store at least computer program code and a set of notification criteria for each of a plurality of mobile electronic devices respectively within or coupled to a corresponding one of the objects; and
at least one processor to perform at least some of the computer program code,
wherein the at least one processor performs at least some of the computer program code to track movement and conditions of the plurality of objects, the computer program code comprises:
computer program code for receiving status information associated with an object, the status information being provided by the mobile electronic device within or coupled to the object, the status information including at least position information and monitored condition information, and the monitored condition information being related to monitored conditions of or around the object;

computer program code for accessing, from the storage device, the particular set of notification criteria associated with the object, the particular set of notification criteria including at least a first predetermined criterion for a first type of status information and a second predetermined criterion for a second type of status information;

computer program code for determining whether a notification condition pertaining to the object exists based on the status information and the particular set of notification criteria associated with the object;

computer program code for producing a notification message when the notification condition exists; and computer program code for initiating electronically sending the notification message to an interested user, wherein the status information includes the first type of status information, and the notification condition is determined to exist based on a first comparison of the first type of status information with the first predetermined criterion for the first type of status information, wherein the status information includes the second type of status information, and the notification condition is determined to exist based on a second comparison of the second type of status information with the second predetermined criterion for the second type of status information, and wherein the mobile electronic device that acquires the status information is a battery-powered, electronic device that is by itself portable.

47. A server machine as recited in claim 46, wherein the mobile electronic device is by itself portable by a person, wherein the object is by itself portable by a person, and wherein the mobile electronic device remains portable by a person even while being within or coupled to the object.

48. A server machine as recited in claim 46, wherein the mobile electronic device is by itself portable by a person, wherein the object is by itself not portable by a person, and wherein the mobile electronic device is no longer portable by a person after being within or coupled to the object.

49. A server machine as recited in claim 46, wherein the object is a container.

50. A server machine as recited in claim 46, wherein the first type of status information includes acceleration information.

51. A server machine as recited in claim 46, wherein the first type of status information includes light information.

52. A server machine as recited in claim 46,
wherein the monitored condition information includes information concerning motion and information concerning light,
wherein the first type of status information includes light information, and
wherein the second type of status information includes motion information.

53. A server machine as recited in claim 46, wherein the object is a package being shipped, and
wherein the monitored condition information includes information concerning light, temperature, pressure, acceleration and humidity detected during shipment of the package.

54. A server machine as recited in claim 46, wherein the object is a package being shipped, and
wherein the mobile electronic device is placed within or coupled to the package before shipment later removed from the package after shipment.

55. A server machine as recited in claim 46, wherein the object is able to be carried by a person.

56. A server machine as recited in claim 46, wherein the object is a container involved in a delivery, and
wherein the monitored condition information includes information concerning temperature and acceleration detected during delivery of the container.

57. A server machine as recited in claim 46, wherein the object is a container involved in a delivery, and
wherein the monitored condition information includes information concerning acceleration detected during delivery of the container.

58. A server machine as recited in claim 46, wherein the computer program further comprises:
computer program code for permitting an authorized user to access the status information for a plurality of objects, provided the authorized user is authorized to monitor the plurality of objects; and
computer program code for initiating display to the authorized user of a web page that enables a user to monitor the plurality of objects.

59. A server machine as recited in claim 46, wherein the first predetermined criterion and the second predetermined criterion are received via a web interface and stored to the storage device.

60. A server machine as recited in claim 59,
wherein the first predetermined criterion and the second predetermined criterion are provided to the storage device wirelessly via a wireless network, and
wherein the status information is received from the mobile electronic device wirelessly via the wireless network.

61. A server machine as recited in claim 46,
wherein the object is a package,
wherein the package is to be shipped from a shipper to a recipient, and
wherein the server machine supports a web interface permit configuration of the notification messages regarding shipment of the package to be sent to the recipient, the shipper or a third-party.

62. A server machine as recited in claim 46,
wherein the object is a container,
wherein the container is involved in delivery from a shipper to a recipient, and
wherein the server machine supports a web interface permit configuration of the notification messages regarding delivery of the container to be sent to the recipient, shipper or a third-party.

* * * * *